US012057919B2

(12) United States Patent
Horn et al.

(10) Patent No.: US 12,057,919 B2
(45) Date of Patent: Aug. 6, 2024

(54) REPORTING ANGULAR OFFSETS ACROSS A FREQUENCY RANGE

(71) Applicant: QUALCOMM Incorporated, San Diego, CA (US)

(72) Inventors: Idan Michael Horn, Hod Hasharon (IL); Shay Landis, Hod Hasharon (IL); Yehonatan Dallal, Kfar Saba (IL); Ran Berliner, Kfar-Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 671 days.

(21) Appl. No.: 17/148,949

(22) Filed: Jan. 14, 2021

(65) Prior Publication Data

US 2022/0224397 A1 Jul. 14, 2022

(51) Int. Cl.
| | |
|---|---|
| *H04B 7/08* | (2006.01) |
| *H04B 7/06* | (2006.01) |
| *H04W 16/28* | (2009.01) |
| *H04W 72/044* | (2023.01) |
| *H04W 72/21* | (2023.01) |
| *H04W 76/27* | (2018.01) |

(52) U.S. Cl.
CPC ........... *H04B 7/086* (2013.01); *H04B 7/0617* (2013.01); *H04W 16/28* (2013.01); *H04W 72/046* (2013.01); *H04W 72/21* (2023.01); *H04W 76/27* (2018.02)

(58) Field of Classification Search
None
See application file for complete search history.

(56) References Cited

U.S. PATENT DOCUMENTS

| | | | | |
|---|---|---|---|---|
| 9,813,150 | B1* | 11/2017 | Bitra | H04B 10/116 |
| 10,037,046 | B1* | 7/2018 | Kadanka | G05F 1/575 |
| 10,348,539 | B1* | 7/2019 | Midha | H04L 27/16 |
| 11,320,516 | B1* | 5/2022 | Crouch | G01S 13/36 |
| 11,729,646 | B2* | 8/2023 | Hirzallah | H04L 5/0048 |
| | | | | 370/252 |
| 2002/0167444 | A1* | 11/2002 | Lee | H04W 64/00 |
| | | | | 342/387 |
| 2007/0287385 | A1* | 12/2007 | Stephenne | H04B 7/08 |
| | | | | 455/562.1 |

(Continued)

OTHER PUBLICATIONS

International Search Report and Written Opinion—PCT/US2021/063802—ISA/EPO—Apr. 4, 2022.

*Primary Examiner* — Michael J Moore, Jr.
*Assistant Examiner* — Gautam Sharma
(74) *Attorney, Agent, or Firm* — Holland & Hart LLP

(57) ABSTRACT

Methods, systems, and devices for wireless communications are described. A receiving device may receive a signal over a first frequency from a transmitting device. The receiving device may determine a set of angular offsets associated with communicating signals over a set of frequencies based on the angle of arrival of the signal, where each frequency of the set of frequency may be offset from the first frequency by a different amount. The receiving device may indicate the set of angular offsets to the transmitting device. The transmitting device may adapt a reception configuration for receiving signals from the receiving device, transmitting signal to the receiving device, or both based on the indication of the set of angular offsets.

30 Claims, 13 Drawing Sheets

(56) References Cited

U.S. PATENT DOCUMENTS

| | | | |
|---|---|---|---|
| 2010/0045506 A1* | 2/2010 | Law | G01S 19/21 |
| | | | 342/13 |
| 2013/0210435 A1* | 8/2013 | Dimou | H04W 36/0085 |
| | | | 455/436 |
| 2014/0269389 A1* | 9/2014 | Bukkfejes | H04W 24/08 |
| | | | 370/252 |
| 2015/0092875 A1* | 4/2015 | Kim | H04B 7/0632 |
| | | | 375/267 |
| 2016/0335897 A1* | 11/2016 | Naserian | H04W 4/46 |
| 2017/0134103 A1* | 5/2017 | Tessandori | H04W 24/08 |
| 2018/0287822 A1 | 10/2018 | Wang et al. | |
| 2019/0173537 A1 | 6/2019 | Cai et al. | |
| 2019/0190655 A1* | 6/2019 | Pan | H04L 1/0072 |
| 2019/0386744 A1* | 12/2019 | Plank | G01S 17/88 |

* cited by examiner

REPORTING ANGULAR OFFSETS ACROSS A FREQUENCY RANGE

FIELD OF TECHNOLOGY

The following relates to wireless communications, including reporting angular offsets across a frequency range.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A base station may communicate with a UE using frequencies that are included in one or more frequency bands. Also, a base station may transmit signals to the UE using a transmission beam that points in the direction of the UE, and the UE may transmit signals to the base station using a transmission beam that points in the direction of the base station.

SUMMARY

The described techniques relate to improved methods, systems, devices, and apparatuses that support reporting angular offsets across a frequency range. A receiving device may receive a signal over a first frequency from a transmitting device. The receiving device may determine a set of angular offsets associated with communicating signals over a set of frequencies based on the angle of arrival of the signal, where each frequency of the set of frequency may be offset from the first frequency by a different amount. The receiving device may indicate the set of angular offsets to the transmitting device. The transmitting device may adapt a reception configuration for receiving signals from the receiving device, transmitting signal to the receiving device, or both based on the indication of the set of angular offsets.

A method for wireless communication at a user equipment (UE) is described. The method may include receiving, from a base station, a signal over a reference frequency, determining a set of angular offsets associated with communicating over a set of frequencies based on an angle of arrival of the signal, where each frequency of the set of frequencies includes an offset in frequency from the reference frequency, and transmitting, to the base station, an indication of the set of angular offsets with respect to the angle of arrival.

An apparatus for wireless communication at a UE is described. The apparatus may include a processor, memory in electronic communication with the processor, and instructions stored in the memory. The instructions may be executable by the processor to cause the apparatus to receive, from a base station, a signal over a reference frequency, determine a set of angular offsets associated with communicating over a set of frequencies based on an angle of arrival of the signal, where each frequency of the set of frequencies includes an offset in frequency from the reference frequency, and transmit, to the base station, an indication of the set of angular offsets with respect to the angle of arrival.

Another apparatus for wireless communication at a UE is described. The apparatus may include means for receiving, from a base station, a signal over a reference frequency, means for determining a set of angular offsets associated with communicating over a set of frequencies based on an angle of arrival of the signal, where each frequency of the set of frequencies includes an offset in frequency from the reference frequency, and means for transmitting, to the base station, an indication of the set of angular offsets with respect to the angle of arrival.

A non-transitory computer-readable medium storing code for wireless communication at a UE is described. The code may include instructions executable by a processor to receive, from a base station, a signal over a reference frequency, determine a set of angular offsets associated with communicating over a set of frequencies based on an angle of arrival of the signal, where each frequency of the set of frequencies includes an offset in frequency from the reference frequency, and transmit, to the base station, an indication of the set of angular offsets with respect to the angle of arrival.

Some examples of the method, apparatuses, and non-transitory computer-readable medium described herein may further include operations, features, means, or instructions for determining a set of frequency offsets based on the set of frequencies and the reference frequency, where the set of angular offsets may be determined based on the set of frequency offsets and generating a report including the angle of arrival and the set of angular offsets, each frequency offset of the set of frequency offsets corresponding to an angular offset of the set of angular offsets.

Some examples of the method, apparatuses, and non-transitory computer-readable medium described herein may further include operations, features, means, or instructions for transmitting the report in an uplink control information message, a radio resource control message, or both, where transmitting the indication of the set of angular offsets includes transmitting the report.

Some examples of the method, apparatuses, and non-transitory computer-readable medium described herein may further include operations, features, means, or instructions for receiving, from the base station, a message indicating the set of frequencies, where the set of frequency offsets may be determined based on one or more differences between the set of frequencies and the reference frequency.

In some examples of the method, apparatuses, and non-transitory computer-readable medium described herein, the reference frequency may be in a first frequency band and one or more of the set of frequencies may be in a second frequency band.

Some examples of the method, apparatuses, and non-transitory computer-readable medium described herein may further include operations, features, means, or instructions for determining the angle of arrival of the signal based on receiving the signal over the reference frequency and determining a set of angles of arrival associated with communicating the signals over the set of frequencies that may be offset from the reference frequency based on the angle of arrival of the signal, where the set of angular offsets may be determined based on differences between the set of angles of arrival and the angle of arrival of the signal.

Some examples of the method, apparatuses, and non-transitory computer-readable medium described herein may further include operations, features, means, or instructions for determining, for the angle of arrival of the signal received over the reference frequency, a first component associated with a first axis and a second component associated with a second axis and determining, for the set of angles of arrival, first components associated with the first axis and second components associated with the second axis.

In some examples of the method, apparatuses, and non-transitory computer-readable medium described herein, determining the set of angular offsets may include operations, features, means, or instructions for determining, for the set of angular offsets, first components associated with the first axis based on differences between the first components of the set of angles of arrival and the first component of the angle of arrival of the signal, and second components associated with the second axis based on differences between the second components of the set of angles of arrival and the second component of the angle of arrival of the signal.

Some examples of the method, apparatuses, and non-transitory computer-readable medium described herein may further include operations, features, means, or instructions for generating a report including a first portion indicating the first components of the set of angular offsets for the first axis and a second portion indicating the second components of the set of angular offsets for the second axis.

Some examples of the method, apparatuses, and non-transitory computer-readable medium described herein may further include operations, features, means, or instructions for receiving one or more reference signals over the reference frequency, where the one or more reference signals include a channel state information reference signal, a demodulation reference signal, or both and determining the angle of arrival of the signal received over the reference frequency based on the one or more reference signals.

In some examples of the method, apparatuses, and non-transitory computer-readable medium described herein, determining the angle of arrival of the signal received over the reference frequency may include operations, features, means, or instructions for determining a coordinate system based on a position of the UE relative to a surface of the earth and determining the angle of arrival in accordance with the coordinate system.

Some examples of the method, apparatuses, and non-transitory computer-readable medium described herein may further include operations, features, means, or instructions for generating a report including the set of angular offsets based on the coordinate system.

Some examples of the method, apparatuses, and non-transitory computer-readable medium described herein may further include operations, features, means, or instructions for determining a second angle of arrival associated with a second signal received over the reference frequency that may be different than the angle of arrival and determining a second set of angular offsets associated with communicating the signals over the set of frequencies that may be offset from the reference frequency based at least in on a difference between the second angle of arrival and the angle of arrival satisfying a threshold.

In some examples of the method, apparatuses, and non-transitory computer-readable medium described herein, the set of angular offsets may be associated with uplink communications and the method, apparatuses, and non-transitory computer-readable medium may include further operations, features, means, or instructions for determining a second set of angular offsets associated with receiving downlink signals over the set of frequencies, where the indication transmitted by the UE indicates the second set of angular offsets.

Some examples of the method, apparatuses, and non-transitory computer-readable medium described herein may further include operations, features, means, or instructions for determining a set of multiple sets of angular offsets associated with communicating the signals over the set of frequencies that may be offset from the reference frequency, the set of multiple sets of angular offsets being associated with a set of multiple spatial streams and including the set of angular offsets, where the indication transmitted by the UE indicates the set of multiple spatial streams and the set of multiple sets of angular offsets.

In some examples of the method, apparatuses, and non-transitory computer-readable medium described herein, the set of angular offsets may be based on an antenna configuration of the UE, an orientation of the UE, a polarization of a corresponding signal, a frequency of the corresponding signal, or any combination thereof.

A method for wireless communication at a base station is described. The method may include transmitting, to a UE, a signal over a reference frequency, receiving, from the UE, an indication of an angle of arrival of the signal and a set of angular offsets associated with communicating over a set of frequencies based on transmitting the signal, where each frequency of the set of frequencies includes an offset in frequency from the reference frequency, and adapting an antenna configuration for communicating with the UE over the reference frequency and the set of frequencies based on the indication of the angle of arrival and the set of angular offsets.

An apparatus for wireless communication at a base station is described. The apparatus may include a processor, memory in electronic communication with the processor, and instructions stored in the memory. The instructions may be executable by the processor to cause the apparatus to transmit, to a UE, a signal over a reference frequency, receive, from the UE, an indication of an angle of arrival of the signal and a set of angular offsets associated with communicating over a set of frequencies based on transmitting the signal, where each frequency of the set of frequencies includes an offset in frequency from the reference frequency, and adapt an antenna configuration for communicating with the UE over the reference frequency and the set of frequencies based on the indication of the angle of arrival and the set of angular offsets.

Another apparatus for wireless communication at a base station is described. The apparatus may include means for transmitting, to a UE, a signal over a reference frequency, means for receiving, from the UE, an indication of an angle of arrival of the signal and a set of angular offsets associated with communicating over a set of frequencies based on transmitting the signal, where each frequency of the set of frequencies includes an offset in frequency from the reference frequency, and means for adapting an antenna configuration for communicating with the UE over the reference frequency and the set of frequencies based on the indication of the angle of arrival and the set of angular offsets.

A non-transitory computer-readable medium storing code for wireless communication at a base station is described. The code may include instructions executable by a processor to transmit, to a UE, a signal over a reference frequency, receive, from the UE, an indication of an angle of arrival of the signal and a set of angular offsets associated with communicating over a set of frequencies based on transmitting the signal, where each frequency of the set of frequencies includes an offset in frequency from the reference frequency, and adapt an antenna configuration for communicating with the UE over the reference frequency and the set of frequencies based on the indication of the angle of arrival and the set of angular offsets.

In some examples of the method, apparatuses, and non-transitory computer-readable medium described herein, adapting the antenna configuration may include operations, features, means, or instructions for modifying a configuration of one or more antenna panels of an antenna array based on the indication of the angle of arrival and the set of angular offsets.

In some examples of the method, apparatuses, and non-transitory computer-readable medium described herein, adapting the antenna configuration may include operations, features, means, or instructions for modifying a configuration of one or more transmission/reception points based on the indication of the angle of arrival and the set of angular offsets.

Some examples of the method, apparatuses, and non-transitory computer-readable medium described herein may further include operations, features, means, or instructions for transmitting, to the UE, a message indicating the set of frequencies, where the indication of the set of angular offsets received from the UE may be based on the message.

Some examples of the method, apparatuses, and non-transitory computer-readable medium described herein may further include operations, features, means, or instructions for activating a set of component carriers for communicating with the UE based on the indication of the set of angular offsets.

In some examples of the method, apparatuses, and non-transitory computer-readable medium described herein, receiving the indication of the angle of arrival and the set of angular offsets may include operations, features, means, or instructions for receiving a first component of the angle of arrival associated with a first axis, a second component of the angle of arrival associated with a second axis, first components of the set of angular offsets associated with the first axis, and second components of the set of angular offsets associated with the second axis.

Some examples of the method, apparatuses, and non-transitory computer-readable medium described herein may further include operations, features, means, or instructions for receiving, from the UE, a message indicating a coordinate system used by the UE and a position of the UE relative to a surface of the earth.

DETAILED DESCRIPTION

Figure 1:
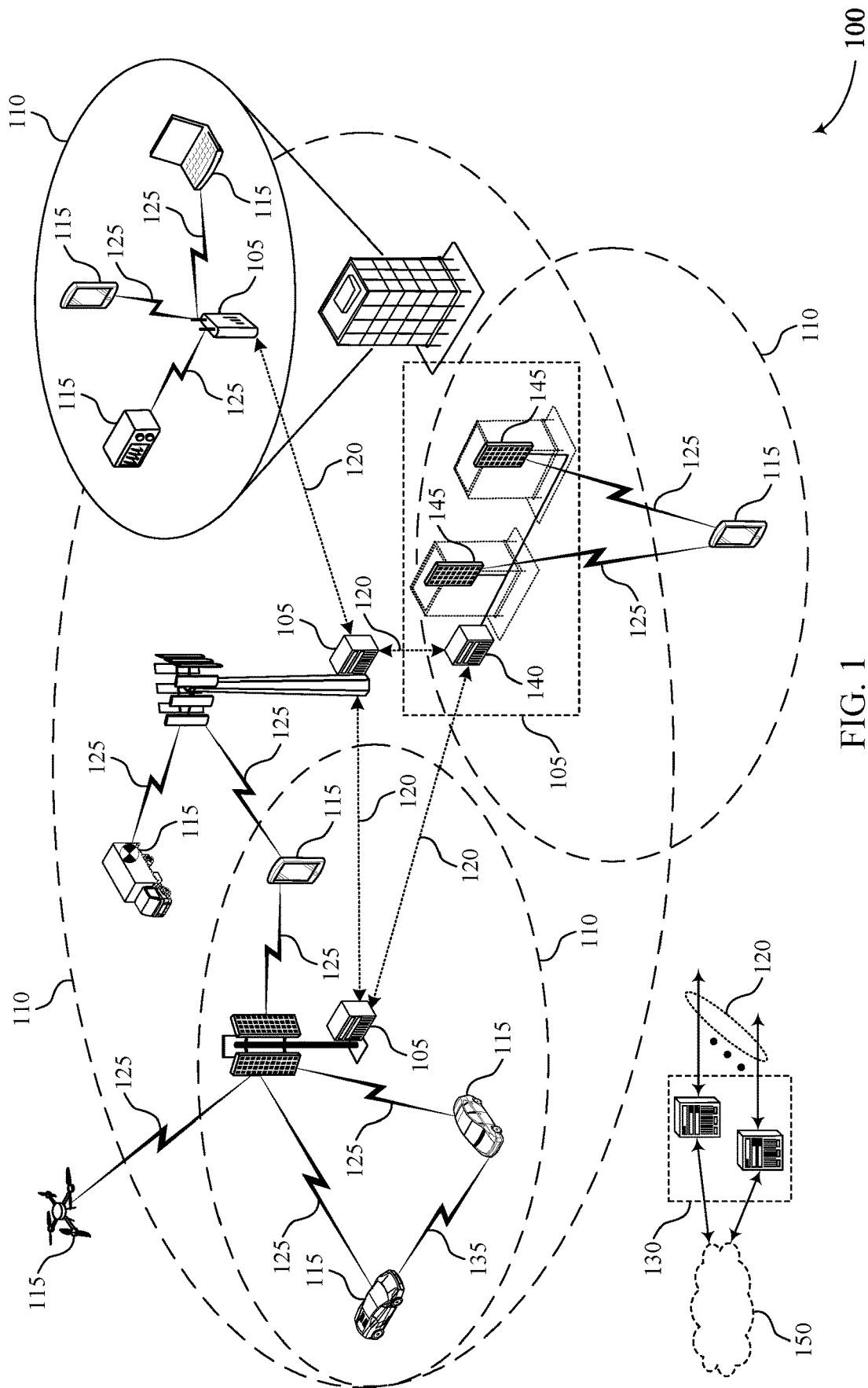
FIG. 1 illustrates an example of a wireless communications system that supports reporting angular offsets across a frequency range in accordance with aspects of the present disclosure.

A transmitting device may communicate with receiving devices using one or more beams. Also, the transmitting device may communicate with receiving devices using narrow frequency bandwidths (e.g., that span around 100 MHz) or wide frequency bandwidths (e.g., that span around 7 GHz). When the transmitting device communicates with a receiving device using a narrow frequency bandwidth, a direction of the beam formed by the transmitting device may remain pointed at the receiving device across the narrow frequency bandwidth. When the transmitting device communicates with a receiving device using a wide frequency bandwidth, a direction of the beam formed by the transmitting device may point in directions that deviate from the direction of the receiving device for outer portions of the wide frequency bandwidth. The deviations in the direction of the beam (e.g., as a function of frequency) may be referred to as "beam squint."

In some examples, the deviations in the direction of the beam may be based on an antenna configuration (e.g., a quantity of antennas, position of antennas, weighting of antennas, etc.), orientation of the transmitting device, or both. When wide beams and wide frequency bandwidths are used for communications between wireless devices, the effect of deviations in the beam direction across a wide frequency bandwidth may be negligible. That is, the boundary of a wide beam formed by a transmitting device may be wide enough to encompass the receiving device even when a direction of the wide beam deviates from a direction of the receiving device.

When narrow beams and wide frequency bandwidths are used for communications between wireless devices, the effect of deviations in the beam direction across a wide frequency bandwidth may cause transmission failures. That is, the boundary of a narrow beam formed by a transmitting device may not be wide enough to encompass a receiving device when a direction of the narrow beam deviates from the direction of the receiving device—e.g., for transmissions (or portions of a transmission) that use the outer frequencies of the wide frequency bandwidth. Thus, a strength of signals transmitted using a narrow beam and received at a receiving device over outer frequencies of the wide frequency bandwidth may be below a threshold.

To accommodate for deviations in the direction of a narrow beam that may occur across a wide frequency bandwidth, a wireless device may determine and report a set of deviations that occur across the wide frequency bandwidth. In some examples, a wireless device (e.g., a UE) may determine an angle of arrival for one or more signals received from another wireless device (e.g., a base station) via a first frequency in a frequency band (e.g., a center frequency or carrier frequency of a frequency band). The wireless device may then determine a set of relative angles of arrival associated with communicating signals over other frequencies (e.g., outer frequencies) in the frequency band. In some examples, the set of relative angles of arrival may be represented as angular offsets from the angle of arrival determined for the one or more signals received via the first frequency. The wireless device may transmit the determined angle of arrival and the set of relative angles of arrival to the other wireless device.

The other wireless device may use the received angle of arrival and the set of relative angles of arrival to compensate for deviations in the direction of a narrow beam formed between the wireless device and other wireless device that occur across a wide frequency bandwidth. In some examples, the other wireless device may modify an antenna configuration so that different components of an antenna array may be used to receive different components of a signal transmitted over different frequency ranges of a wide frequency bandwidth. In some examples, the other wireless device may modify an antenna configuration so that different components of an antenna array may be used to transmit different components of a signal to the wireless device over different frequency ranges of the wide frequency bandwidth—e.g., so the resulting beams point in the direction of the receiving device across a wide frequency bandwidth.

By reporting, by a first wireless device to another wireless device, the deviations in beam direction that may occur across a wide frequency bandwidth, the other wireless device may take measures to accommodate for the variations in the beam direction, increasing a throughput of communications between wireless devices.

Aspects of the disclosure are initially described in the context of wireless communications systems. Aspects of the disclosure are also described in the context of a process flow. Aspects of the disclosure are further illustrated by and described with reference to apparatus diagrams, system diagrams, and flowcharts that relate to reporting angular offsets across a frequency range.

FIG. 1 illustrates an example of a wireless communications system 100 that supports reporting angular offsets across a frequency range in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or another network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or another interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information-reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

A wireless communications system 100 may support communications over multiple spatially-multiplexed beams. In some examples, a base station 105 may simultaneously communicate with UEs in different beams of the multiple beams—e.g., using a common set of frequencies across the beams. In this way, a base station 105 may reuse portions of wireless spectrum while communicating with UEs in different regions of a coverage area 110 of the base station 105, increasing a throughput of the wireless network. In some examples, communication devices (e.g., a base station 105, a UE 115, or both) may be equipped with a large quantity of antenna elements (e.g., in an antenna array). The large quantity of antenna elements may support the formation of narrow communication beams e.g., so that an increased quantity of beams may be supported within a coverage area 110 and a throughput of communications may be increased. In some examples, UEs 115 that include a large quantity of antenna elements include cell phones, routers, tablets, laptops, and the like.

Additionally, or alternatively, a wireless communications system 100 may support communications over high frequencies (e.g., over frequencies in the sub-THz frequency range). In some examples, communications using higher frequencies may use larger subcarrier spacings, shorter symbol periods, wider bandwidths, narrower beams, or any combination thereof, than communications using lower frequencies. By using wider bandwidths, a throughput of communications between wireless device may be increased linearly (or nearly linearly) while a transmission power may be increased at a lower rate (e.g., non-linearly)—e.g., enabling significant increases to communications throughput before (or without) saturating a power amplifier. In some examples, wireless devices that communicate over high frequencies may have antenna arrays with an increased quantity of antenna elements relative to wireless devices that communicate over lower frequencies—e.g., due to the shorter wavelengths associated with communications over high frequencies.

In some examples, an antenna array of a wireless device may be configured to operate within a frequency range (e.g., within a 100 MHz frequency range) of a high frequency band (e.g., a sub-THz frequency band; 141 GHz to 148.5 GHz, for example). For example, a wireless device may configure its antenna array to form a transmission beam in a first direction (e.g., a direction of another wireless device) within the operating frequency range (e.g., within 144.95 GHz and 145.05 GHz)—e.g., by applying a combination of beam weights to all or a portion of the antenna elements in the antenna array. Thus, transmissions from the antenna array within the operating frequency range may propagate in the first direction. When a wireless communications system 100 supports communications using wide frequency bandwidths (e.g., bandwidths that span multiple GHz; from 1 to 10 GHz, for example), a direction of the transmission beam formed by the antenna array may change based on the set of frequencies used by the wireless device. That is, while a first transmission (or a first portion of a transmission) from a wireless device within the operating frequency range (e.g., within 144.95 GHz and 145.05 GHz) may propagate in a desired direction, a direction of a second transmission (or a second portion of the transmission) from the wireless device outside of the operating frequency range, but within the wide frequency bandwidth (e.g., the 141 GHz to 148.5 GHz frequency band), may propagate in directions that deviate from the desired direction. The deviation in the direction of the transmission beam (e.g., as a function of frequency) may be referred to as "beam squint."

When wide beams and wide frequency bandwidths are used for communications between wireless devices, the effect of deviations in the beam direction across a wide frequency bandwidth may be negligible. That is, the boundary of a wide beam formed by a transmitting device may be wide enough to encompass the receiving device even when a direction of the wide beam deviates from (e.g., no longer points in) a direction of the receiving device—e.g., for transmissions (or portions of a transmission) that use the outer frequencies of the wide frequency bandwidth.

When narrow beams and wide frequency bandwidths are used for communications between wireless devices, the effect of deviations in the beam direction across a wide frequency bandwidth may cause transmission failures. That is, the boundary of a narrow beam formed by a transmitting device may not be wide enough to encompass a receiving device when a direction of the narrow beam deviates from the direction of the receiving device—e.g., for transmissions (or portions of a transmission) that use the outer frequencies of the wide frequency bandwidth. Thus, a strength of signals transmitted using a narrow beam and received at a receiving device over outer frequencies of the wide frequency bandwidth may be below a threshold.

To accommodate for deviations in the direction of a narrow beam that may occur across a wide frequency bandwidth, a wireless device may determine and report a set of deviations that occur across the wide frequency bandwidth. In some examples, a wireless device (e.g., a UE) may determine an angle of arrival for one or more signals received from another wireless device (e.g., a base station) via a first frequency in a frequency band (e.g., a center frequency or carrier frequency of a frequency band). The wireless device may then determine a set of relative angles of arrival associated with communicating signals over other frequencies (e.g., outer frequencies) in the frequency band. In some examples, the set of relative angles of arrival may be represented as angular offsets from the angle of arrival determined for the one or more signals received via the first frequency. The wireless device may transmit a beam squint report based on or including the determined angle of arrival and the set of relative angles of arrival to the other wireless device.

The other wireless device may use the received angle of arrival and the set of relative angles of arrival to compensate for deviations in the direction of a narrow beam formed between the wireless device and other wireless device that occur across a wide frequency bandwidth. In some examples, the other wireless device may modify an antenna configuration so that different components of an antenna array may be used to receive different components of a signal transmitted over different frequency ranges of a wide frequency bandwidth. In some examples, the other wireless device may modify an antenna configuration so that different components of an antenna array may be used to transmit different components of a signal to the wireless device over different frequency ranges of the wide frequency bandwidth—e.g., so the resulting beams point in the direction of the receiving device across a wide frequency bandwidth.

By reporting, by a first wireless device to another wireless device, the deviations in beam direction that may occur across a wide frequency bandwidth, the other wireless device may take measures to accommodate for the variations in the beam direction, increasing a throughput of communications between wireless devices.

Figure 2:
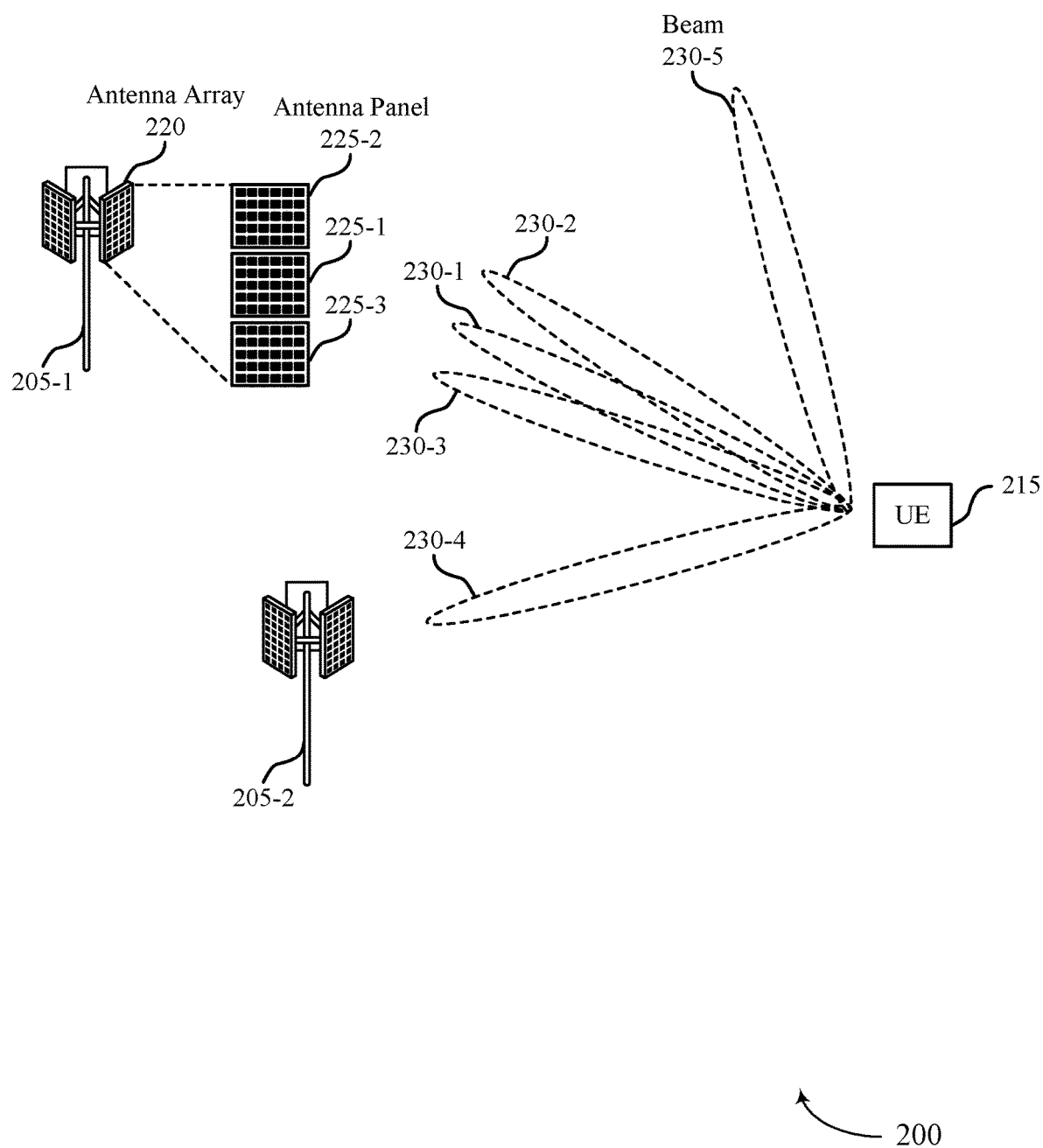
FIG. 2 illustrates an example of a wireless communications subsystem that supports reporting angular offsets across a frequency range in accordance with aspects of the present disclosure.

FIG. 2 illustrates an example of a wireless communications subsystem that supports reporting angular offsets across a frequency range in accordance with aspects of the present disclosure.

Wireless communications subsystem 200 may include first base station 205-1, second base station 205-2, and UE 215, which may be examples of base stations and UEs described in FIG. 1. First base station 205-1, second base station 205-2, and UE 215 may communicate with one another using one or more of the techniques described in FIG. 1. In some examples, first base station 205-1 and second base station 205-2 are a part of a same base station, where first base station 205-1 may be a first TRP and second base station 205-2 may be a second TRP of the base station.

First base station 205-1 and second base station 205-2 may include antenna arrays that include one or more antenna panels. For example, first base station 205-1 may include antenna array 220, and antenna array 220 may include first antenna panel 225-1, second antenna panel 225-2, and third antenna panel 225-3. The antenna panels 225 may each include an array of antenna elements, which may be used to transmit and receive beamformed transmissions.

In some examples, UE 215 communicates with one or both of first base station 205-1 and second base station 205-2 via one or more beam. In some examples, the one or more beams are narrow beams, as described herein. In some examples, an antenna array at UE 215 may be configured to form a beam that supports communications between UE 215 and a base station—e.g. by applying a set of beam weights to all or a portion of the antenna elements of the antenna array used to transmit and receive communications. For example, to support communications between first base station 205-1 and UE 215, UE 215 may configure the antenna array to form first beam 230-1 in a desired direction. The antenna array at UE 215 may be configured to operate within a frequency range (e.g., within a 100 MHz frequency range) of a frequency band (e.g., a 141 GHz to 148.5 GHz band)—e.g., a central frequency range (e.g., 144.95 GHz and 145.05 GHz).

In some examples, UE 215 communicates with base stations using wide frequency bandwidths (e.g., across a 7.5 GHz frequency bandwidth). In such cases, transmissions (or portions of a transmission) from UE 215 using the antenna configuration used to form first beam 230-1 may propagate in a direction that deviates from a direction of first beam 230-1 e.g., when the transmissions are performed over outer bands of the wide frequency bandwidth. For example, a transmission (or portion of a transmission) from UE 215 performed over a frequency range that is offset from the operating frequency of the antenna array by a first amount (e.g., 1 GHz) may be included in second beam 230-2, which may be unintentionally formed for the offset frequency range by the antenna array at UE 215. Similarly, a transmission (or portion of a transmission) from UE 215 performed over a frequency range that is offset from the operating frequency of the antenna array by the first amount in the opposite direction (e.g., −1 GHz) may be included in third beam 230-3. Also, a transmission (or portion of a transmission) from UE 215 performed over a frequency range that is offset from the operating frequency of the antenna array and included in a different frequency band (e.g., an adjacent lower frequency band) may be included in fourth beam 230-4. And a transmission (or portion of a transmission) from UE 215 performed over a frequency range that is offset from the operating frequency of the antenna array and included in a different frequency band (e.g., an adjacent higher frequency band) may be included in fifth beam 230-5. The deviation in the propagation direction of the transmissions from UE 215 as a function of frequency and in the direction of the unintentionally formed beams may be referred to as "beam squint."

As described herein, the deviation in the propagation direction of a wide-bandwidth transmissions across different frequency ranges of a wide frequency bandwidth may cause transmissions (or portions of a transmission) performed over outer portions of the wide frequency bandwidth to fail—e.g., because an antenna array at the receiving device may be configured to receive transmissions from UE 215 from a particular direction (e.g., the direction of first beam 230-1.

In some examples, to accommodate for the deviations in the propagation direction of transmissions (or portions of a transmission) from UE 215 that occur across a wide frequency bandwidth, UE 215 may determine and report the deviations to one or more base stations (e.g., to first base station 205-1) for a set of frequencies. In such examples, UE 215 may determine an angle of arrival (e.g., 25 degrees) of a transmission received from first base station 205-1 within a first frequency range (e.g., within 144.95 GHz and 145.05 GHz) of a frequency band. In some examples, the determined angle of arrival corresponds to an angle of arrival of first beam 230-1. In some examples, the angle of arrival is determined based on reference signals (e.g., CSI-RS or DMRS) received within the first frequency range.

UE 215 may estimate angles of arrival for transmissions to be transmitted to first base station 205-1 over different frequency ranges of the frequency band or other frequency bands. In some examples, UE 215 estimates the angle of arrival for transmissions (or portions of a transmission) performed over frequencies that are offset from the first frequency range by ±1 GHz, ±2 GHz, and so on, until an edge of the frequency bandwidth is reached. In some examples, the estimated angle of arrival for a +1 GHz frequency offset corresponds to an angle of arrival of second beam 230-2 (e.g., 25.3 degrees) and the estimated angle of arrival for a −1 GHz frequency offset corresponds to an angle of arrival of third beam 230-3 (e.g., 24.4 degrees). In some examples, the estimated angle of arrival for a frequency band offset corresponds to an angle of arrival of fourth beam 230-4 (e.g., 20 degrees). In some examples, UE 215 may represent the different angles of arrival in terms of relative angles of arrival. Thus, in this example, the estimated relative angle of arrival for the +1 GHz frequency offset may be equal to 0.3 degrees, the estimated relative angle of arrival for the −1 GHz frequency offset may be equal to −0.6 degrees, and the estimated relative angle of arrival for the band frequency offset may be equal to −5 degrees.

In some examples, UE 215 may determine the frequency offsets based on signaling received from first base station 205-1. In some examples, UE 215 may estimate the deviations in the angle of arrival for transmission over the different frequency ranges based on an angle of arrival of the signals received over the first frequency range, an orientation of UE 215, a configuration of an antenna array at UE

215, or any combination thereof. Also, in some examples, UE 215 may determine multiple components of the angle of arrivals (e.g., a first component associated with a first axis and a second component associated with a second axis). Additionally, or alternatively, UE 215 may estimate angles of arrival for downlink transmissions to be transmitted from first base station 205-1 over different frequency ranges of the frequency band or other frequency bands. As described in more detail herein and with reference to FIG. 3.

After determining the angle of arrival for signals received in the first frequency range and estimating the angles of arrival for signals to be transmitted/received in offset frequency ranges, UE 215 may generate a report to transmit to a base station (e.g., first base station 205-1). In some examples, the determined angle of arrival and the estimated angles of arrival are reported separately. In other examples, the report includes the determined angle of arrival and the estimated angles of arrival. In some examples, instead of reporting the estimated angles of arrival, UE 215 may report relative angles of arrival that are determined in relation to the determined angle of arrival—e.g., to reduce signaling overhead. In some examples, the report is organized so that the estimated angles of arrival may be associated with the corresponding frequency offsets. In some examples, the report indicates multiple components of the angle of arrival and relative angles of arrival (e.g., a first component associated with a first axis, a second component associated with a second axis, a third component associated with a third axis, etc.). After generating the report (which may be referred to as a "squint report") UE 215 may transmit the report to a base station (e.g., first base station 205-1 via first beam 230-1).

In some examples, first base station 205-1 may receive the report from UE 215. First base station 205-1 may use the report to determine an angle of arrival for transmissions to be transmitted to UE 215, received from UE 215, or both. In some examples, first base station 205-1 may use the report to accommodate for directionally-shifted transmissions from UE 215 (e.g., that occur across a wide frequency bandwidth). For example, first base station 205-1 may reconfigure antenna array 220 so that a first transmission (or a first portion of a transmission) transmitted from UE 215 over a first frequency and via first beam 230-1 is received at first antenna panel 225-1, a second transmission (or a second portion of the transmission) transmitted from UE 215 over a second frequency and via second beam 230-2 is received at second antenna panel 225-2, and a third transmission (or a third portion of the transmission) transmitted from UE 215 over a third frequency and via third beam 230-3 is received at third antenna panel 225-3. Additionally, or alternatively, first base station 205-1 may use second base station 205-2 to receive a fourth transmission (or a fourth portion of the transmission) transmitted from UE 215 over a fourth frequency and via fourth beam 230-4.

Similarly, first base station 205-1 may use the report to reconfigure antenna array 220 so that a first transmission (or a first portion of a transmission) transmitted from first base station 205-1 over a first frequency is transmitted using first antenna panel 225-1 and via first beam 230-1 (or a related beam), a second transmission (or a second portion of the transmission) transmitted from first base station 205-1 over a second frequency is transmitted using second antenna panel 225-2 and via second beam 230-2 (or a related beam), and a third transmission (or a third portion of the transmission) transmitted from first base station 205-1 over a third frequency is transmitted using third antenna panel 225-3 and via third beam 230-3 (or a related beam). Additionally, or alternatively, first base station 205-1 may use second base station 205-2 to transmit a fourth transmission (or a fourth portion of the transmission) to UE 215 over a fourth frequency via fourth beam 230-4 (or a related beam).

In some examples, first base station 205-1 activates component carriers for UE 215 based on the report. For example, first base station 205-1 may activate a first component carrier associated with a first frequency band based on first beam 230-1 providing a communicative path between first base station 205-1 and UE 215 and a second component carrier associated with a second frequency band based on fourth beam 230-4 providing a communicative path between second base station 205-2 and UE 215. Also, first base station 205-1 may refrain from activating a component carrier associated with a third frequency band based on fifth beam 230-5 not providing a communicative path between UE 215 and a base station.

Figure 3:
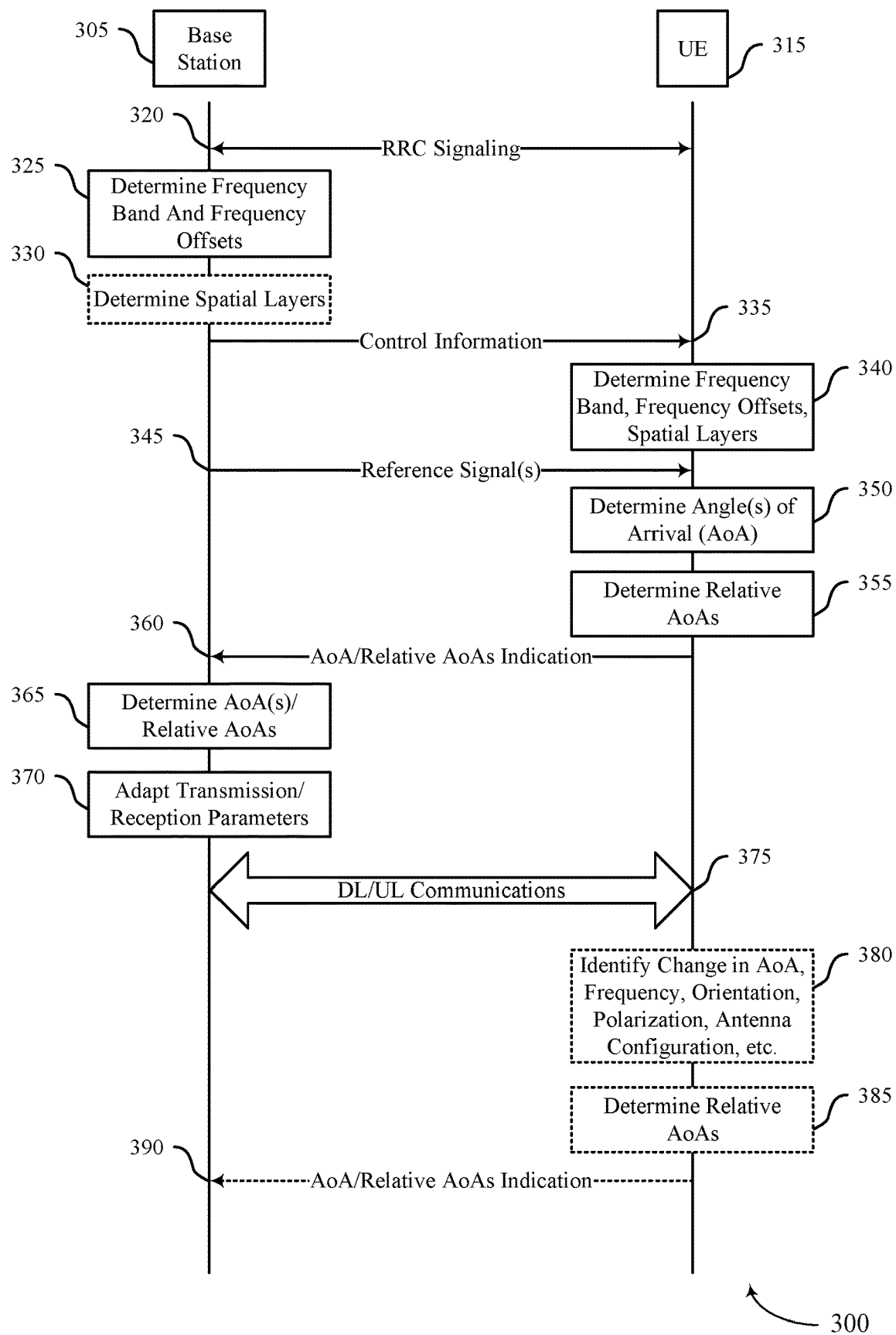
FIG. 3 illustrates an example of a process flow that supports reporting angular offsets across a frequency range in accordance with aspects of the present disclosure.

FIG. 3 illustrates an example of a process flow that supports reporting angular offsets across a frequency range in accordance with aspects of the present disclosure.

Process flow 300 may be performed by base station 305 and UE 315, which may be examples of a base station or UE described in FIGS. 1 and 2. In some examples, base station 305 includes multiple TRPs that are separated from one another by a geographic distance (e.g., 10 meters). In some examples, UE 315 includes an antenna array that includes multiple antenna elements. The antenna array may be configured to operate within a frequency range (e.g., within 144.95 GHz and 145.05 GHz). UE 315 may configure the antenna elements to form a transmission beam, or reception beam, in a desired direction e.g. by applying sets of beam weights to all or a portion of the antenna elements. In some examples, UE 315 uses a first configuration of the antenna elements to transmit signaling and a second configuration of the antenna elements to receive signaling. In some examples, UE 315 changes a configuration of the antenna array during operation—e.g., to change a direction of a transmission beam, reception beam, or both. In some examples, UE 315 may support a large quantity of antenna elements (e.g., greater than eight antenna elements) that support the formation of narrow beams.

In some examples, process flow 300 illustrates an exemplary sequence of operations performed to support reporting angular offsets across a frequency range. For example, process flow 300 depicts operations for reporting relative angles of arrival for different frequency ranges of a wide frequency bandwidth and operations and operations for compensating for changes in angles of arrival that occur as a function of frequency. It is understood that one or more of the operations described in process flow 300 may be performed earlier or later in the process, omitted, replaced, supplemented, or performed in combination with another operation. Also, additional operations described herein that are not included in process flow 300 may be included.

At arrow 320, base station 305 and UE 315 may exchange radio resource control (RRC) signaling. As part of the RRC signaling, UE 315 may indicate a capability to generate a squint report. Base station 305 may indicate support for a squint reporting mode and, in some examples, may send a message enabling a squint reporting mode at UE 315. The message may include an indication of a reference frequency for determining a first angle of arrival of signals transmitted over the reference frequency (e.g., a center frequency of a frequency band) and a set of frequencies offset from the reference frequency for determining relative angles of arrival of signals to be communicated over the set of frequencies. In some examples, UE 315 may transmit an indication of the reference frequency to base station 305 (e.g., based on a configuration of an antenna array at UE 315). In some examples, base station 305 may indicate a coordinate system (e.g., cartesian or polar) for UE 315 to use for determining the angle of arrival. In some examples, UE 315 may indicate, to base station 305, a coordinate system to be used by UE 315 to determine the angle of arrival.

At 325, base station 305 may determine a frequency band for communicating with UE 315 and a set of frequency offsets associated with communicating with UE 315 within the frequency band. In some examples, the set of frequency offsets may be relative to a carrier frequency of the frequency band. For example, for a frequency band that includes the 141 GHz to 148.5 GHz range of a wireless spectrum, the carrier frequency may be 145 GHz, and the frequency offsets may be ±1 GHz, ±2 GHz, and so on—e.g., the frequency offsets may correspond to 142 GHz, 143 GHz, 144 GHz, 146 GHz, 147 GHz, and 148 GHz. In some examples, base station 305 determines multiple frequency bands for communicating with UE 315 (e.g., one or more of the 111.8 GHz to 114.25 GHz frequency band, 116 GHz to 123 GHz frequency band, 130 GHz to 134 GHz frequency band, 134 GHz to 141 GHz frequency band, 141 GHz to 148.5 GHz frequency band, 151.5 GHz to 155.5 GHz frequency band, 155.5 GHz to 158.5 GHz frequency band, etc.).

At 330, base station 305 may determine one or more spatial layers for communicating with UE 315. In some examples, base station 305 may determine one or more spatial layers within a frequency band configured for UE 315. Base station 305 may communicate with UE 315 over the one or more spatial layers over one or more frequency bands (which may also be referred to as component carriers).

At 335, base station 305 may transmit control information to UE 315. In some examples, the control information indicates one or more frequency bands (that are configured or configurable for UE 315). The control information may also indicate frequency offsets associated with the one or more frequency bands. In some examples, the control information directs UE 315 to estimate relative angles of arrival for frequencies within a frequency band that are offset from a carrier frequency by multiples of a frequency offset (e.g., ±1 GHz, ±2 GHz, and so on). In some examples, the control information directs UE 315 to estimate relative angles of arrival for carrier frequencies of frequency bands that are adjacent to a configured frequency band (e.g., a lower and upper frequency band). Also, the control information may indicate spatial layers configured for communicating with UE 315. In some examples, the information is included in a downlink control information (DCI) message. In some examples, the frequency offsets are included in a MAC-CE message.

At 340, UE 315 may determine a frequency band that is configured for communications between base station 305 and UE 315. UE 315 may also determine one or more frequency offsets from a carrier frequency of the frequency band. Also, UE 315 may determine one or more spatial layers configured for communicating with UE 315. In some examples, UE 315 determines all (or a portion) of the information based on the previously received control information, RRC information, or both. In some examples, UE 315 determines a portion of the information (e.g., the frequency offsets) based at least in part on instructions previously programmed into UE 315.

At 345, base station 305 may transmit one or more reference signals to UE 315 using the carrier frequency of the frequency band. In some examples, the one or more reference signals are included in a downlink transmission to UE 315 that includes data for UE 315. The one or more reference signals may be CSI-RSs or DMRSs. In some examples, base station 305 transmits one or more references signals over each spatial layer configured for UE 315.

At 350, UE 315 may determine an angle of arrival of signals transmitted using the carrier frequency of the frequency band—e.g., based on the one or more reference signals. UE 315 may determine multiple components of the angle of arrival. For example, UE 315 may determine a first component of the angle of arrival associated with a first axis (e.g., a phi axis) and a second component of the angle of arrival associated with a second axis (e.g., a theta axis)—e.g., if UE 315 uses a polar coordinate system. Or UE 315 may determine a first component of the angle of arrival associated with a first axis (e.g., an x axis), a second component of the angle of arrival associated with a second axis (e.g., a y axis), and a third component of the angle of arrival associated with a third axis (e.g., a z axis)—e.g., if UE 315 uses a cartesian coordinate system. In some examples, UE 315 determines a reference point (or origin) for the selected coordinate system relative to a surface of the earth (e.g., the ground).

For example, for polar coordinates, the theta axis may be parallel to the ground and have a center that is aligned with a center of UE 315, and the phi axis may be orthogonal to theta axis and have a center that is aligned with a center of UE 315.0r, for rectangular coordinates, the x-axis may be parallel to the ground, extend in a North direction, for example, and pass through a center of UE 315, the y-axis may be perpendicular to the x-axis and pass through a center of UE 315, and the z-axis may be parallel to the ground, perpendicular to both the x-axis and y-axis, and pass through a center of UE 315. In some examples, the angle of arrival may be based on a position and orientation of UE 315, an environment of UE 315, or both. In some examples, UE 315 may determine a set of angles of arrival for a set of signals received over multiple spatial layers configured for UE 315.

At 355, UE 315 may determine a set of relative angles of arrival based on the determined angle of arrival. In some examples, the set of relative angles of arrival may be expressed as angular offsets from the determined angle of arrival. To determine the set of relative angles of arrival, UE 315 may estimate an angle of arrival for signals communicated over frequencies that are offset from the carrier frequency of the frequency band. For example, if the determined angle of arrival is associated with a 145 GHz carrier frequency, UE 315 may estimate angles of arrival for frequencies that are offset (e.g., in 1 GHz increments) from the 145 GHz carrier frequency—that is, UE 315 may estimate angles of arrival for a 142 GHz frequency, 143 GHz frequency, 144 GHz frequency, 146 GHz frequency, 147 GHz frequency, and 148 GHz frequency. In some examples, UE 315 may estimate angles of arrival for carrier frequencies that are offset from the 145 GHz carrier frequency—that is, UE 315 may estimate angles of arrival for a 137.5 GHz carrier frequency (e.g., 134 GHz to 141 GHz) of a lower frequency band and a 153.5 GHz carrier frequency of a higher frequency band (e.g., 151.5 GHz to 155.5 GHz).

In some examples, UE 315 estimates a set of angles of arrival for downlink transmissions and a set of angles of arrival for uplink transmissions based on the determined angle of arrival. Estimating the angles of arrival for the offset frequencies may be based on a configuration of the antenna elements of UE 315, an orientation of UE 315, a polarization of the transmitted signals, a frequency of the carrier frequency, or any combination thereof. In some examples, UE 315 obtains relative angles of arrival (and/or departure) for the offset frequencies by subtracting the estimated angles of arrival from the determined angle of arrival. In some examples, UE 315 estimates a set of relative angles of arrival for each spatial layer configured for UE 315—e.g., based on an angle of arrival determined for each spatial layer. By using relative angles of arrival, an amount of information used to indicate the angles of arrival for the offset frequencies may be reduced relative to indicating the estimated full angles of arrival.

In some examples, UE 315 may estimate additional sets of relative angles of arrival based on a set of angles of arrival that is related to the determined angle of arrival. For example, if UE 315 determines, using a polar coordinate system, an angle of arrival of (3 degrees, 5 degrees), UE 315 may also estimate sets of relative angles of arrival for a set of offset angles of arrival—e.g., first offset angle of arrival (2 degrees, 5 degrees), second offset angle of arrival (4 degrees, 5 degrees), third offset angle of arrival (3 degrees, 4 degrees), and fourth offset angle of arrival (3 degrees, 6 degrees).

At 360, UE 315 may transmit, to base station 305, a report (such as a squint report) that indicates the determined angle of arrival, the relative angles of arrival, or both. In some examples, the report includes multiple components of the determined angle of arrival and the relative angles of arrival associated with different axes of a coordinate system (e.g., a polar coordinate system). Table 1 depicts an exemplary report that includes the determined angle of arrival, a set of relative angles of arrival associated with a first axis, and a set of relative angles of arrival associated with a second axis.

TABLE 1

| Angle of Arrival (AoA) | | | | | | |
|---|---|---|---|---|---|---|
| First Axis (θ) | | | 10° | | | |
| Second Axis (ø) | | | −50 | | | |
| Relative Angles of Arrival—First Axis | | | | | | |
| Relative Frequency (GHz) | −2 | −1 | 1 | 2 | Fc-137.5 GHz | Fc-153.5 GHz |
| Relative AoA (degrees) | −1.1° | −0.6° | 0.3° | 0.9° | −5° | 4.3° |
| Relative Angles of Arrival—Second Axis | | | | | | |
| Relative Frequency (GHz) | −2 | −1 | 1 | 2 | Fc-137.5 GHz | Fc-153.5 GHz |
| Relative AoA (degrees) | −0.3° | −0.1° | 0.1° | 0.2° | −1.5° | 1.3° |

In some examples, the report includes the determined angle of arrivals, the corresponding relative angles of arrival, or both for each spatial layer configured for UE 315. Such a report may include multiple versions of the exemplary report depicted in Table 1 for each spatial layer. In some examples, the report includes the determined angle of arrival, the related angles of arrival, and the corresponding relative angles of arrival for each of the determined angle of arrival and the related angles of arrival. Such a report may include multiple versions of the exemplary report depicted in Table 1 for each of the determined angle of arrival and the related angles of arrival. The related angles of arrival may include a set of offset angles of arrival—e.g., where a set of offset angles of arrival may be represented as first offset angle of arrival (9 degrees, 5 degrees), second offset angle of arrival (11 degrees, 5 degrees), third offset angle of arrival (10 degrees, −6 degrees), and fourth offset angle of arrival (10 degrees, −4 degrees).

In some examples, estimating the relative angles of arrival is based on the determined or related angles of arrival—e.g., the relative angles of arrival estimated for the determined relative angle of arrival may be different than the relative angles of arrival estimated for an offset angle of arrival. Reporting relative angles of arrival for a set of offset angles of arrival in addition to the relative angles of arrival determined for the determined angle of arrival may decrease a latency associated with reporting a new set of relative angles of arrival when an angle of arrival associated with the carrier frequency changes—e.g., by more than a threshold amount.

In some examples, UE 315 may report the determined angle of arrival and the relative angles of arrival separately (e.g., in different reports). In some examples, the report may be included in a channel state information (CSI) reporting message, an RRC message, an angle of arrival reporting message, or a combination thereof.

At 365, base station 305 may determine an angle of arrival for a carrier frequency and a set of relative angles of arrival in relation to the determined angle of arrival. In some examples, base station 305 may determine a set of angles of arrival for a carrier frequency and corresponding sets of relative angles of arrival for each spatial layer configured for UE 315. In some examples, base station 305 may determine an angle of arrival for a carrier frequency, a set of related (e.g., offset) angles of arrival for the carrier frequency, and corresponding sets of relative angles of arrival for the determined and related angles of arrival.

At 370, base station 305 may adapt transmission parameters, reception parameters, or both based on the determined angle of arrival and set of relative angles of arrival. Base station 305 may adapt the transmission parameters, reception parameters, or both based on a direction of transmissions from UE 315 over different frequency ranges, as indicated by the determined angle of arrival and the set of relative angles of arrival. In some examples, base station 305 may adapt an antenna configuration for reception based on the set of relative angles of arrival so that a first portion of a signal transmitted from UE 315 using a first portion (e.g., a center portion) of a frequency band will be received at a first antenna panel, a second portion of the signal transmitted using a second portion (e.g., a upper portion) of the frequency band will be received at a second antenna panel, and a third portion of the signal transmitted using a third portion (e.g., a lower portion) of the frequency band will be received at a third antenna panel.

In some examples, base station 305 may adapt a TRP configuration based on the set of relative angles that a first portion of a signal transmitted from UE 315 using a portion (e.g., a center portion) of a frequency band will be received at a first TRP and a second portion of the signal transmitted using a portion (e.g., a center portion) of another frequency band will be received at a second TRP. In some examples, base station 305 may adapt reflectors to refocus signals received over offset frequency ranges to a single antenna panel based on the relative angles of arrival.

Similarly, base station 305 may adapt an antenna configuration for transmissions based on the set of relative angles of arrival so that a first portion of a signal transmitted from base station 305 using a first portion (e.g., a center portion) of a frequency band will be transmitted from a first antenna panel, a second portion of the signal transmitted using a second portion (e.g., a upper portion) of the frequency band will be transmitted from a second antenna panel, and a third portion of the signal transmitted using a third portion (e.g., a lower portion) of the frequency band will be transmitting from a third antenna panel. Also, base station 305 may adapt a TRP configuration based on the set of relative angles that a first portion of a signal transmitted from base station 305 using a portion (e.g., a center portion) of a frequency band will be transmitted from a first TRP and a second portion of the signal transmitted using a portion (e.g., a center portion) of another frequency band will be transmitted from a second TRP.

In some examples, base station 305 selects a set of component carriers to activate for carrier-aggregated communications to UE 315 based on the set of relative angles. For example, base station 305 may select a first component carrier associated with a first frequency band configured for UE 315 and a second component carrier associated with an adjacent, lower frequency band based on the beam being indicated between UE 315 and another TRP controlled by base station 305 by the relative angles of arrival.

At 375, base station 305 and UE 315 may communicate with one another based on the transmission parameters, reception parameters, or both being adapted at base station 305. In some examples, adapting the transmission parameters, reception parameters, or both increases a reliability and throughput of communications between base station 305 and UE 315.

At 380, UE 315 may identify a change in one or more characteristics of signals received over the carrier frequency of the frequency band (e.g., the primary frequency band) that is configured for UE 315 (also referenceable as the reference frequency). In some examples, UE 315 may determine a change in an angle of arrival of the signals that exceeds a threshold (e.g., a change of greater than 1 degree in one or more axes). In some examples, UE 315 may determine a change in an orientation of UE 315 that exceeds a threshold. In some examples, UE 315 may determine a change in a polarization of signals transmitted to UE 315. In some examples, UE 315 may change an antenna configuration used to transmit or receive signals to or from base station 305. Or a combination thereof.

At 385, after detecting a change in the characteristics of the signals or a change in a communication configuration, or both, UE 315 may recalculate the set(s) of relative angles of arrival with relation to the determined angle(s) or arrival and, in some examples, the related angle(s) of arrival. In some examples, if only the determined angle of arrival changes, UE 315 may refrain from recalculating the set(s) of angles of arrival—e.g., based on previously estimating the set(s) of angles of arrival for related angle(s) of arrival. In some examples, UE 315 may recalculate the set(s) of relative angles of arrival based on the occurrence of an event. For example, UE 315 may recalculate the sets of relative angles of arrival after detecting a handover event, a change in a carrier frequency configured for UE 315, or after receiving an RRC message requesting an updated squint report.

At 390, UE 315 may transmit the newly determined angle(s) of arrival to base station 305. In some examples, UE 315 may also transmit the corresponding relative angles of arrival. And, in some examples, UE 315 may also transmit the corresponding related angle(s) of arrival. In some examples, UE 315 may only transmit the newly determined angle(s) of arrival—e.g., if UE 315 previously reported relative angles of arrival corresponding to the newly determined angles of arrival.

Figure 4:
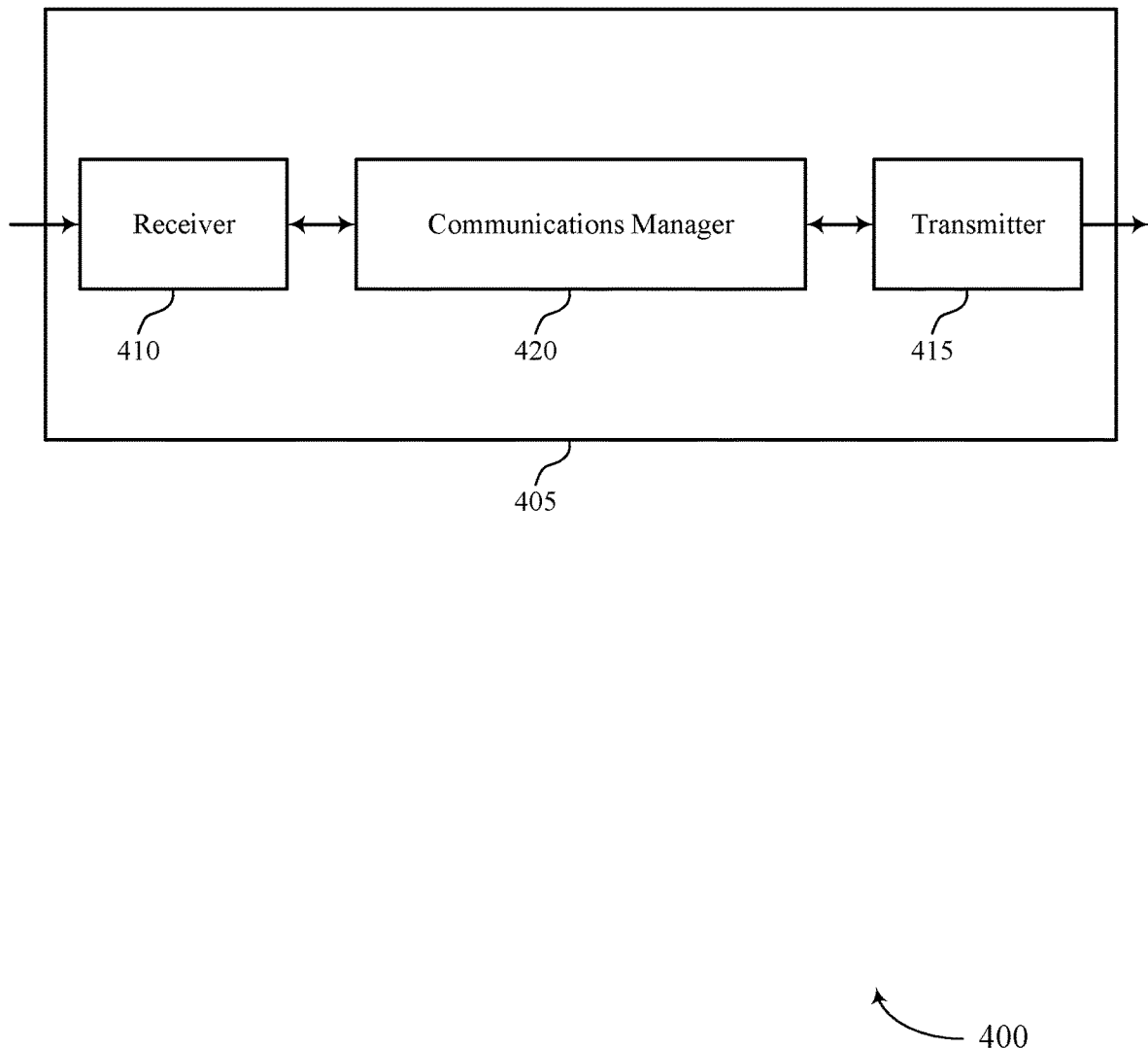
FIGS. 4 and 5 show block diagrams of devices that support reporting angular offsets across a frequency range in accordance with aspects of the present disclosure.

FIG. 4 shows a block diagram 400 of a device 405 that supports reporting angular offsets across a frequency range in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to reporting angular offsets across a frequency range). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to reporting angular offsets across a frequency range). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of reporting angular offsets across a frequency range as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for receiving, from a base station, a signal over a reference frequency. The communications manager 420 may be configured as or otherwise support a means for determining a set of angular offsets associated with communicating over a set of frequencies based on an angle of arrival of the signal, where each frequency of the set of frequencies includes an offset (e.g., a different offset) in frequency from the reference frequency. The communications manager 420 may be configured as or otherwise support a means for transmitting, to the base station, an indication of the set of angular offsets with respect to the angle of arrival.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for accommodating for variations in beam direction that may occur across a wide frequency range, increasing a throughput of communications between wireless devices.

Figure 5:
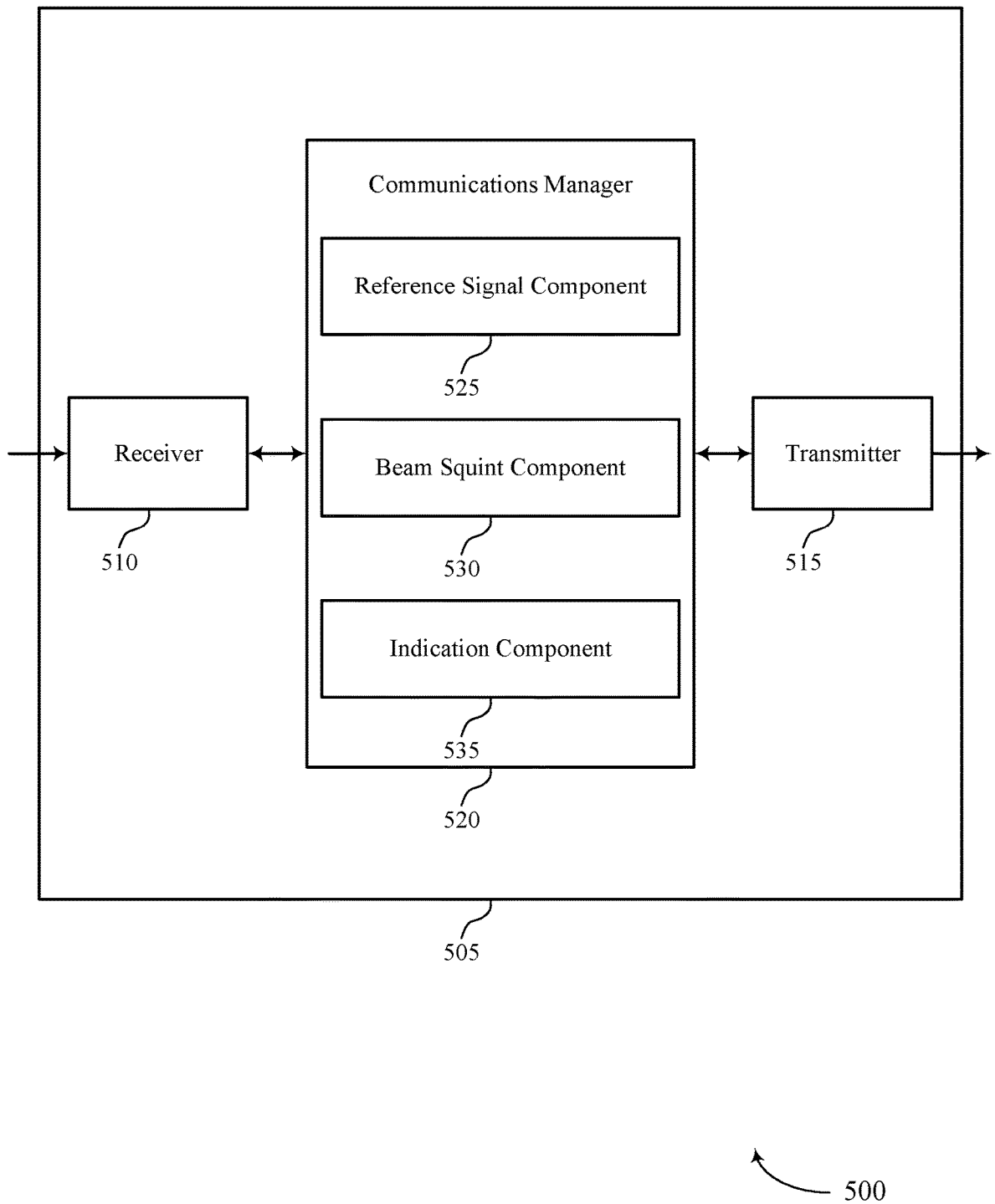

FIG. 5 shows a block diagram 500 of a device 505 that supports reporting angular offsets across a frequency range in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to reporting angular offsets across a frequency range). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to reporting angular offsets across a frequency range). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of reporting angular offsets across a frequency range as described herein. For example, the communications manager 520 may include a reference signal component 525, a beam squint component 530, an indication component 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The reference signal component 525 may be configured as or otherwise support a means for receiving, from a base station, a signal over a reference frequency. The beam squint component 530 may be configured as or otherwise support a means for determining a set of angular offsets associated with communicating over a set of frequencies based on an angle of arrival of the signal, where each frequency of the set of frequencies includes an offset (e.g., a different offset) in frequency from the reference frequency. The indication component 535 may be configured as or otherwise support a means for transmitting, to the base station, an indication of the set of angular offsets with respect to the angle of arrival.

Figure 6:
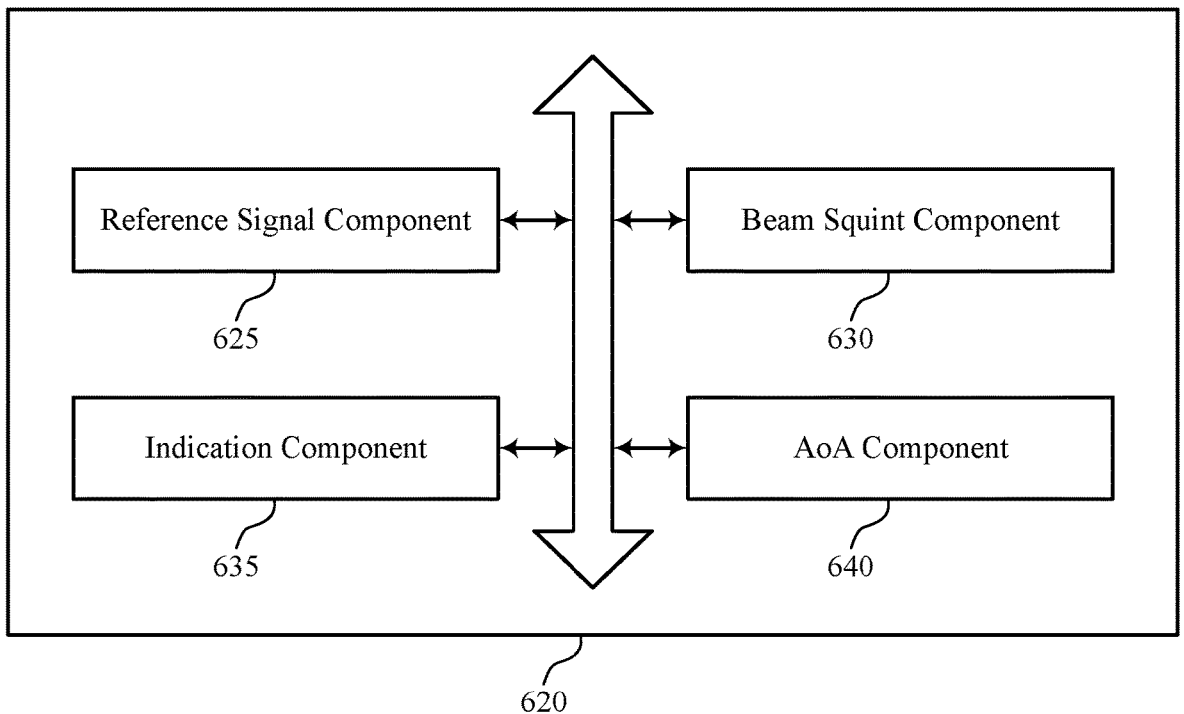
FIG. 6 shows a block diagram of a communications manager that supports reporting angular offsets across a frequency range in accordance with aspects of the present disclosure.

FIG. 6 shows a block diagram 600 of a communications manager 620 that supports reporting angular offsets across a frequency range in accordance with aspects of the present disclosure. The communications manager 620 may be an example of aspects of a communications manager 420, a communications manager 520, or both, as described herein. The communications manager 620, or various components thereof, may be an example of means for performing various aspects of reporting angular offsets across a frequency range as described herein. For example, the communications manager 620 may include a reference signal component 625, a beam squint component 630, an indication component 635, an AoA component 640, or any combination thereof. Each of these components may communicate, directly or indirectly, with one another (e.g., via one or more buses).

The communications manager 620 may support wireless communication at a UE in accordance with examples as disclosed herein. The reference signal component 625 may be configured as or otherwise support a means for receiving, from a base station, a signal over a reference frequency. The beam squint component 630 may be configured as or otherwise support a means for determining a set of angular offsets associated with communicating signals over a set of frequencies based on an angle of arrival of the signal, where each frequency of the set of frequencies includes a different offset from the reference frequency. The indication component 635 may be configured as or otherwise support a means for transmitting, to the base station, an indication of the set of angular offsets with respect to the angle of arrival.

In some examples, the beam squint component 630 may be configured as or otherwise support a means for determining a set of frequency offsets based on the set of frequencies and the reference frequency, where the set of angular offsets are determined based on the set of frequency offsets. In some examples, the beam squint component 630 may be configured as or otherwise support a means for generating a report including the angle of arrival and the set of angular offsets, each frequency offset of the set of frequency offsets corresponding to an angular offset of the set of angular offsets.

In some examples, the indication component 635 may be configured as or otherwise support a means for transmitting the report in an uplink control information message, a radio resource control message, or both, where transmitting the indication of the set of angular offsets includes transmitting the report.

In some examples, the beam squint component 630 may be configured as or otherwise support a means for receiving, from the base station, a message indicating the set of frequencies, where the set of frequency offsets is determined based on one or more differences between the set of frequencies and the reference frequency.

In some examples, the reference frequency is in a first frequency band and one or more of the set of frequencies are in a second frequency band.

In some examples, the AoA component 640 may be configured as or otherwise support a means for determining the angle of arrival of the signal based on receiving the signal over the reference frequency. In some examples, the AoA component 640 may be configured as or otherwise support a means for determining a set of angles of arrival associated with communicating signals over the set of frequencies that are offset from the reference frequency based on the angle of arrival of the signal, where the set of angular offsets is determined based on differences between the set of angles of arrival and the angle of arrival of the signal.

In some examples, the AoA component 640 may be configured as or otherwise support a means for determining, for the angle of arrival of the signal received over the reference frequency, a first component associated with a first axis and a second component associated with a second axis. In some examples, the AoA component 640 may be configured as or otherwise support a means for determining, for the set of angles of arrival, first components associated with the first axis and second components associated with the second axis.

In some examples, to support determining the set of angular offsets, the beam squint component 630 may be configured as or otherwise support a means for determining, for the set of angular offsets, first components associated with the first axis based on differences between the first components of the set of angles of arrival and the first component of the angle of arrival of the signal, and second components associated with the second axis based on differences between the second components of the set of angles of arrival and the second component of the angle of arrival of the signal.

In some examples, the indication component 635 may be configured as or otherwise support a means for generating a report including a first portion indicating the first components of the set of angular offsets for the first axis and a second portion indicating the second components of the set of angular offsets for the second axis.

In some examples, the reference signal component 625 may be configured as or otherwise support a means for receiving one or more reference signals over the reference frequency, where the one or more reference signals include a channel state information reference signal, a demodulation reference signal, or both. In some examples, the AoA component 640 may be configured as or otherwise support a means for determining the angle of arrival of the signal received over the reference frequency based on the one or more reference signals.

In some examples, to support determining the angle of arrival of the signal received over the reference frequency, the AoA component 640 may be configured as or otherwise support a means for determining a coordinate system based on a position of the UE relative to a surface of the earth. In some examples, to support determining the angle of arrival of the signal received over the reference frequency, the AoA component 640 may be configured as or otherwise support a means for determining the angle of arrival in accordance with the coordinate system.

In some examples, the indication component 635 may be configured as or otherwise support a means for generating a report including the set of angular offsets based on the coordinate system.

In some examples, the AoA component 640 may be configured as or otherwise support a means for determining a second angle of arrival associated with a second signal received over the reference frequency that is different than the angle of arrival. In some examples, the beam squint component 630 may be configured as or otherwise support a means for determining a second set of angular offsets associated with communicating signals over the set of frequencies that are offset from the reference frequency based at least in on a difference between the second angle of arrival and the angle of arrival satisfying a threshold.

In some examples, the set of angular offsets is associated with uplink communications, and the beam squint component 630 may be configured as or otherwise support a means for determining a second set of angular offsets associated with receiving downlink signals over the set of frequencies, where the indication transmitted by the UE indicates the second set of angular offsets.

In some examples, the beam squint component 630 may be configured as or otherwise support a means for determining a set of multiple sets of angular offsets associated with communicating signals over the set of frequencies that are offset from the reference frequency, the set of multiple sets of angular offsets being associated with a set of multiple spatial streams and including the set of angular offsets, where the indication transmitted by the UE indicates the set of multiple spatial streams and the set of multiple sets of angular offsets.

In some examples, the set of angular offsets is based on an antenna configuration of the UE, an orientation of the UE, a polarization of a corresponding signal, a frequency of the corresponding signal, or any combination thereof.

Figure 7:
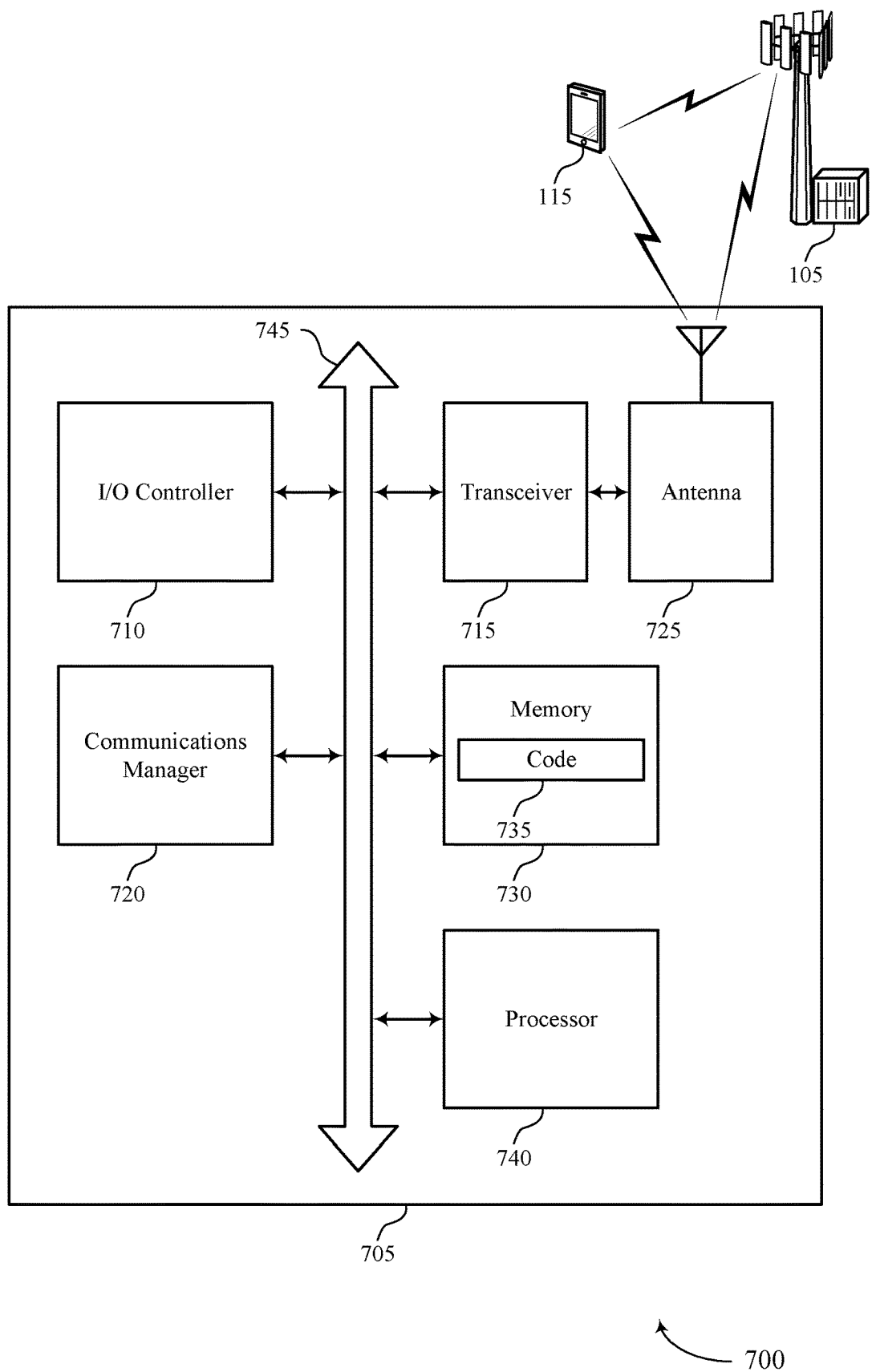
FIG. 7 shows a diagram of a system including a device that supports reporting angular offsets across a frequency range in accordance with aspects of the present disclosure.

FIG. 7 shows a diagram of a system 700 including a device 705 that supports reporting angular offsets across a frequency range in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740.

These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting reporting angular offsets across a frequency range). For example, the device 705 or a component of the device 705 may include a processor 740 and memory 730 coupled to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for receiving, from a base station, a signal over a reference frequency. The communications manager 720 may be configured as or otherwise support a means for determining a set of angular offsets associated with communicating signals over a set of frequencies based on an angle of arrival of the signal, where each frequency of the set of frequencies includes a different offset from the reference frequency. The communications manager 720 may be configured as or otherwise support a means for transmitting, to the base station, an indication of the set of angular offsets with respect to the angle of arrival.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of reporting angular offsets across a frequency range as described herein, or the processor 740 and the memory 730 may be otherwise configured to perform or support such operations.

Figure 8:
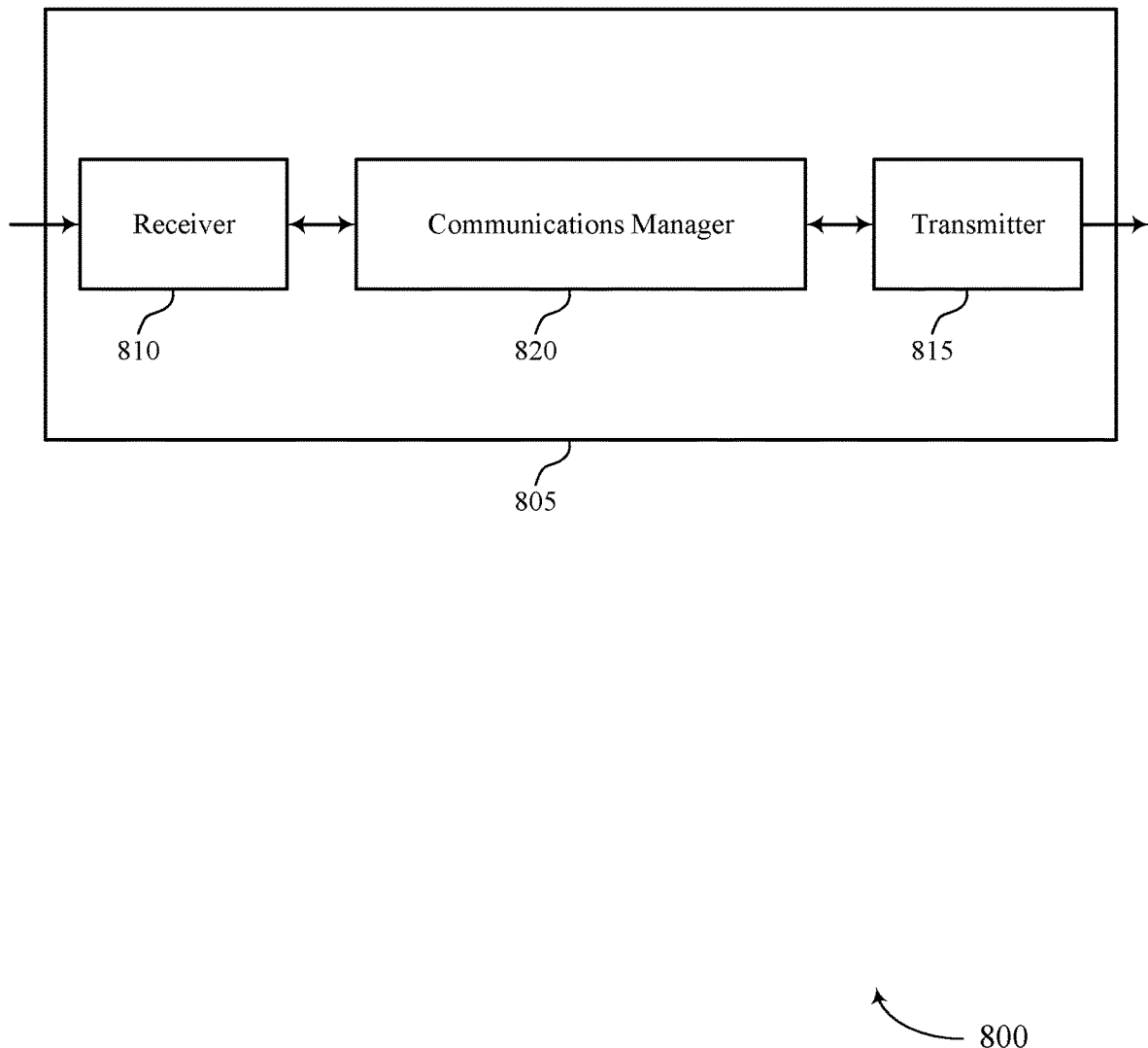
FIGS. 8 and 9 show block diagrams of devices that support reporting angular offsets across a frequency range in accordance with aspects of the present disclosure.

FIG. 8 shows a block diagram 800 of a device 805 that supports reporting angular offsets across a frequency range in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to reporting angular offsets across a frequency range). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to reporting angular offsets across a frequency range). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of reporting angular offsets across a frequency range as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a base station in accordance with examples as disclosed herein. For example, the communications manager 820 may be configured as or otherwise support a means for transmitting, to a UE, a signal over a reference frequency. The communications manager 820 may be configured as or otherwise support a means for receiving, from the UE, an indication of an angle of arrival of the signal and a set of angular offsets associated with communicating (e.g., signals) over a set of frequencies based on transmitting the signal, where each frequency of the set of frequencies includes an offset (e.g., a different offset) from the reference frequency. The communications manager 820 may be configured as or otherwise support a means for adapting an antenna configuration for communicating with the UE over the reference frequency and the set of frequencies based on the indication of the angle of arrival and the set of angular offsets.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for accommodating for variations in beam direction that may occur across a wide frequency range, increasing a throughput of communications between wireless devices.

Figure 9:
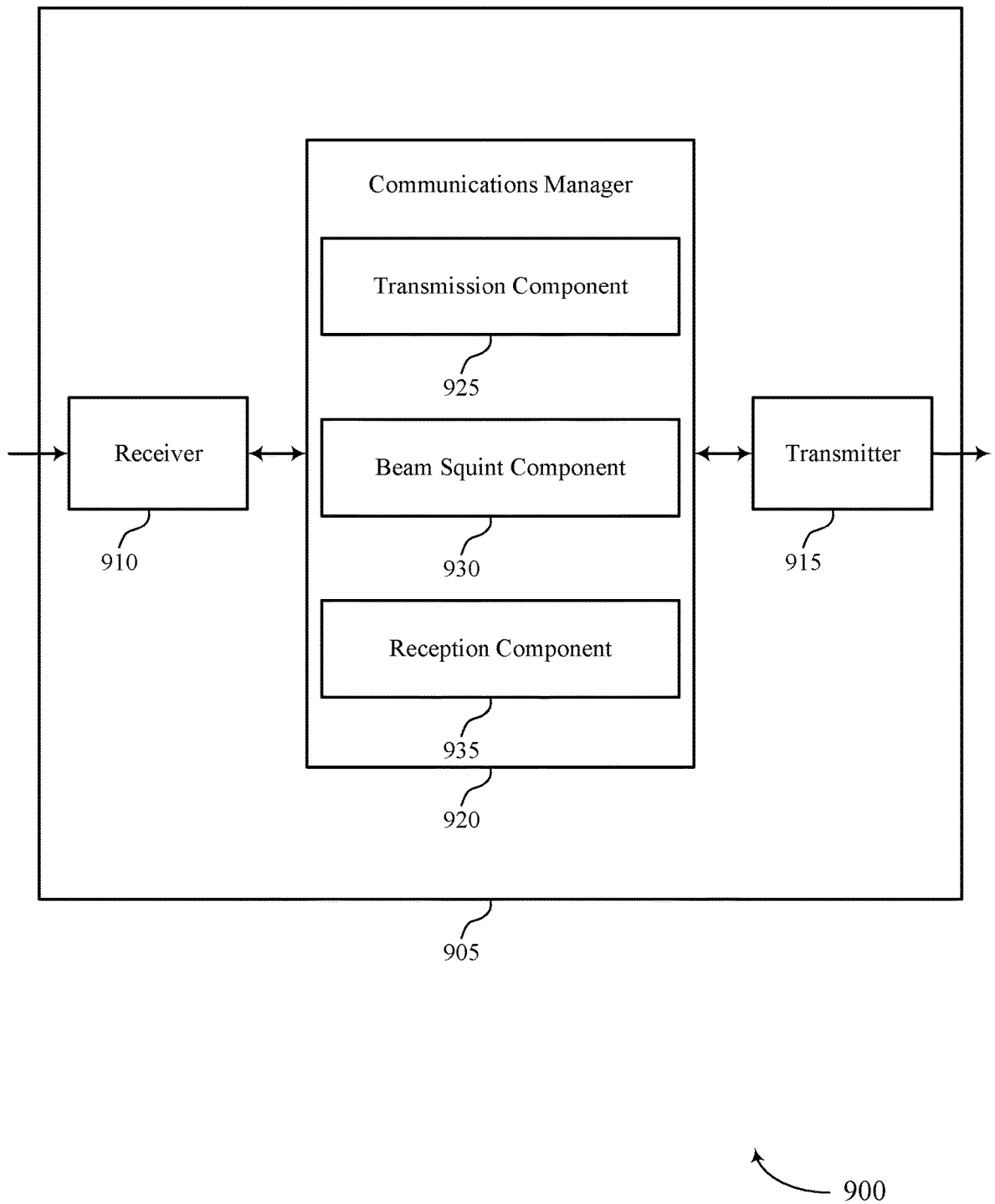

FIG. 9 shows a block diagram 900 of a device 905 that supports reporting angular offsets across a frequency range in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to reporting angular offsets across a frequency range). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to reporting angular offsets across a frequency range). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of reporting angular offsets across a frequency range as described herein. For example, the communications manager 920 may include a transmission component 925, a beam squint component 930, a reception component 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. The transmission component 925 may be configured as or otherwise support a means for transmitting, to a UE, a signal over a reference frequency. The beam squint component 930 may be configured as or otherwise support a means for receiving, from the UE, an indication of an angle of arrival of the signal and a set of angular offsets associated with communicating over a set of frequencies based on transmitting the signal, where each frequency of the set of frequencies includes an offset (e.g., a different offset) from the reference frequency. The reception component 935 may be configured as or otherwise support a means for adapting an antenna configuration for communicating with the UE over the reference frequency and the set of frequencies based on the indication of the angle of arrival and the set of angular offsets.

Figure 10:
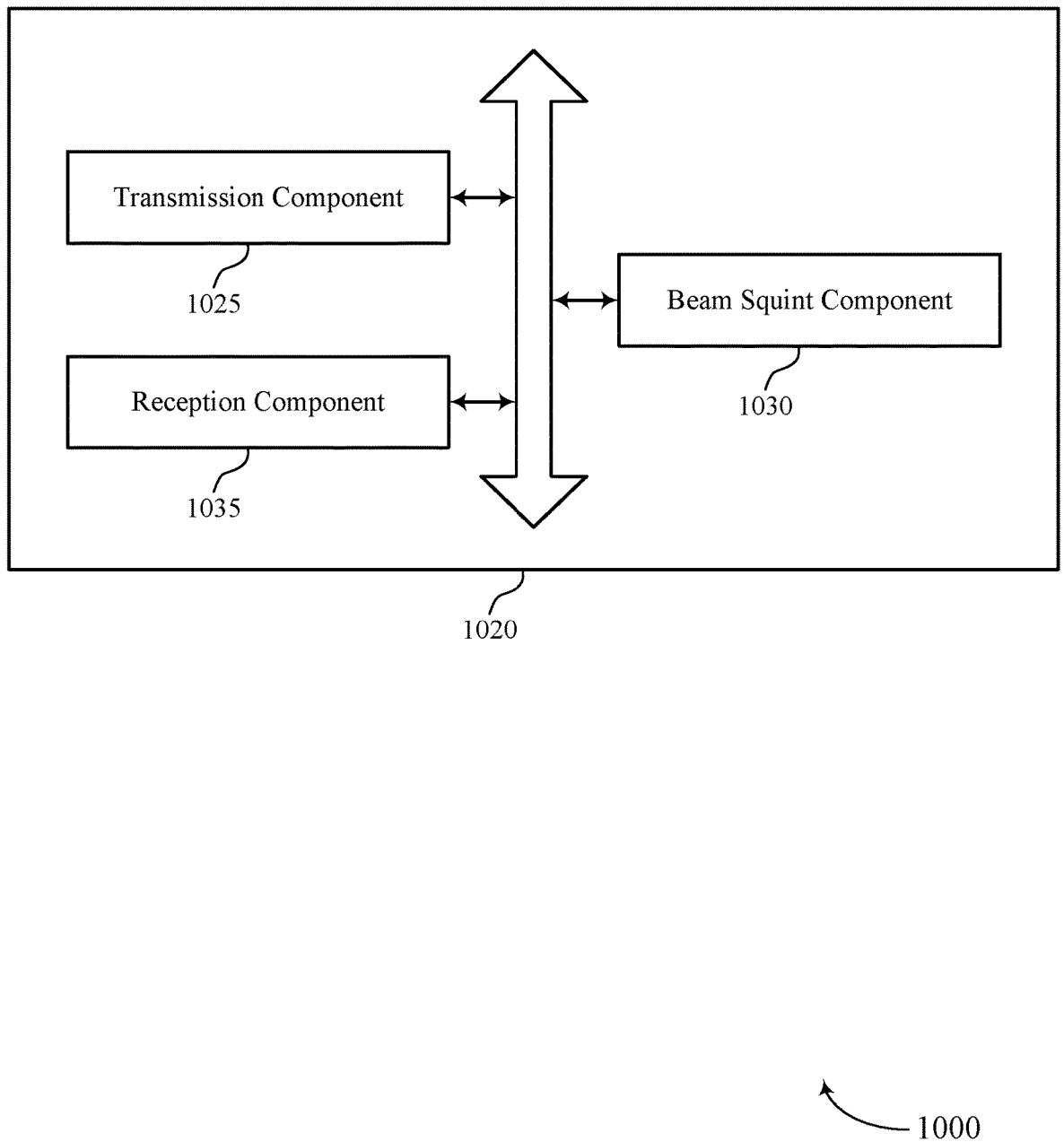
FIG. 10 shows a block diagram of a communications manager that supports reporting angular offsets across a frequency range in accordance with aspects of the present disclosure.

FIG. 10 shows a block diagram 1000 of a communications manager 1020 that supports reporting angular offsets across a frequency range in accordance with aspects of the present disclosure. The communications manager 1020 may be an example of aspects of a communications manager 820, a communications manager 920, or both, as described herein. The communications manager 1020, or various components thereof, may be an example of means for performing various aspects of reporting angular offsets across a frequency range as described herein. For example, the communications manager 1020 may include a transmission component 1025, a beam squint component 1030, a reception component 1035, or any combination thereof. Each of these components may communicate, directly or indirectly, with one another (e.g., via one or more buses).

The communications manager 1020 may support wireless communication at a base station in accordance with examples as disclosed herein. The transmission component 1025 may be configured as or otherwise support a means for transmitting, to a UE, a signal over a reference frequency. The beam squint component 1030 may be configured as or otherwise support a means for receiving, from the UE, an indication of an angle of arrival of the signal and a set of angular offsets associated with communicating over a set of frequencies based on transmitting the signal, where each frequency of the set of frequencies includes a different offset from the reference frequency. The reception component 1035 may be configured as or otherwise support a means for adapting an antenna configuration for communicating with the UE over the reference frequency and the set of frequencies based on the indication of the angle of arrival and the set of angular offsets.

In some examples, to support adapting the antenna configuration, the reception component 1035 may be configured as or otherwise support a means for modifying a configuration of one or more antenna panels of an antenna array based on the indication of the angle of arrival and the set of angular offsets.

In some examples, to support adapting the antenna configuration, the reception component 1035 may be configured as or otherwise support a means for modifying a configuration of one or more transmission/reception points based on the indication of the angle of arrival and the set of angular offsets.

In some examples, the beam squint component 1030 may be configured as or otherwise support a means for transmitting, to the UE, a message indicating the set of frequencies, where the indication of the set of angular offsets received from the UE is based on the message.

In some examples, the transmission component 1025 may be configured as or otherwise support a means for activating a set of component carriers for communicating with the UE based on the indication of the set of angular offsets.

In some examples, to support receiving the indication of the angle of arrival and the set of angular offsets, the beam squint component 1030 may be configured as or otherwise support a means for receiving a first component of the angle of arrival associated with a first axis, a second component of the angle of arrival associated with a second axis, first components of the set of angular offsets associated with the first axis, and second components of the set of angular offsets associated with the second axis.

In some examples, the beam squint component 1030 may be configured as or otherwise support a means for receiving, from the UE, a message indicating a coordinate system used by the UE and a position of the UE relative to a surface of the earth.

Figure 11:
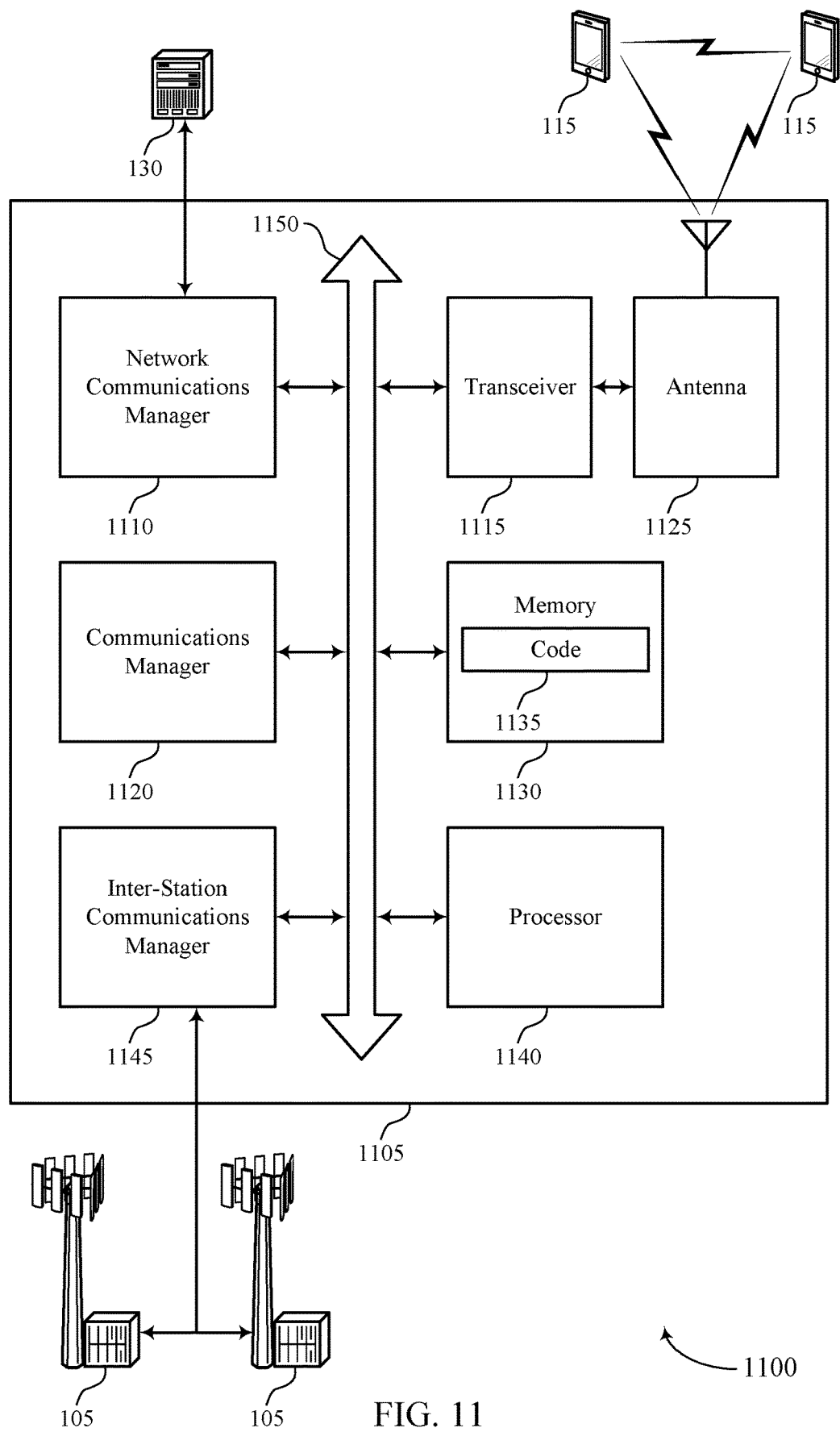
FIG. 11 shows a diagram of a system including a device that supports reporting angular offsets across a frequency range in accordance with aspects of the present disclosure.

FIG. 11 shows a diagram of a system 1100 including a device 1105 that supports reporting angular offsets across a frequency range in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting reporting angular offsets across a frequency range). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a base station in accordance with examples as disclosed herein. For example, the communications manager 1120 may be configured as or otherwise support a means for transmitting, to a UE, a signal over a reference frequency. The communications manager 1120 may be configured as or otherwise support a means for receiving, from the UE, an indication of an angle of arrival of the signal and a set of angular offsets associated with communicating over a set of frequencies based on transmitting the signal, where each frequency of the set of frequencies includes a different offset from the reference frequency. The communications manager 1120 may be configured as or otherwise support a means for adapting an antenna configuration for communicating with the UE over the reference frequency and the set of frequencies based on the indication of the angle of arrival and the set of angular offsets.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of reporting angular offsets across a frequency range as described herein, or the processor 1140 and the memory 1130 may be otherwise configured to perform or support such operations.

Figure 12:
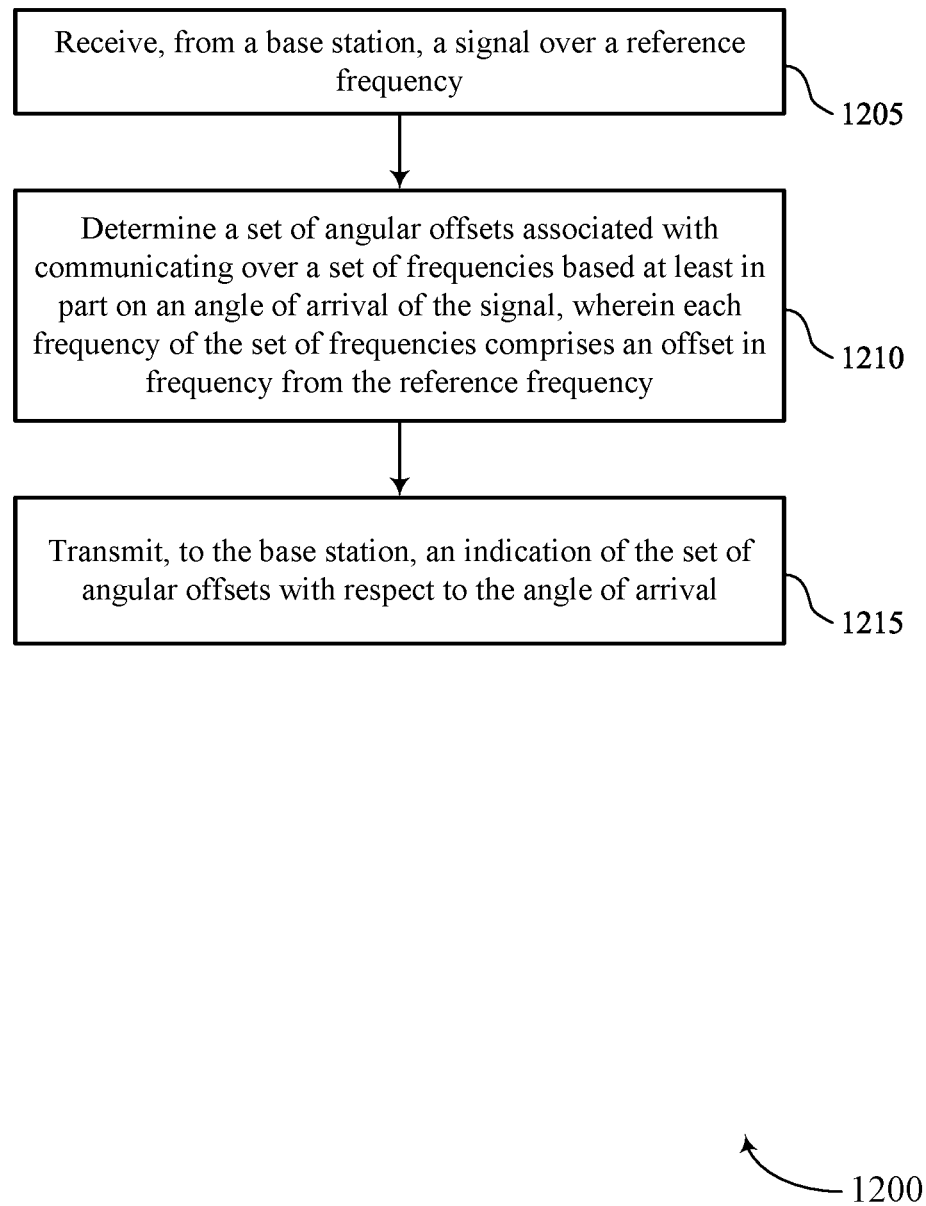
FIGS. 12 and 13 show flowcharts illustrating methods that support reporting angular offsets across a frequency range in accordance with aspects of the present disclosure.

FIG. 12 shows a flowchart illustrating a method 1200 that supports reporting angular offsets across a frequency range in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include receiving, from a base station, a signal over a reference frequency. The operations of 1205 may be performed in accordance with examples as disclosed herein. In some examples, aspects of the operations of 1205 may be performed by a reference signal component 625 as described with reference to FIG. 6.

At 1210, the method may include determining a set of angular offsets associated with communicating signals over a set of frequencies based on an angle of arrival of the signal, where each frequency of the set of frequencies includes a different offset from the reference frequency. The operations of 1210 may be performed in accordance with examples as disclosed herein. In some examples, aspects of the operations of 1210 may be performed by a beam squint component 630 as described with reference to FIG. 6.

At 1215, the method may include transmitting, to the base station, an indication of the set of angular offsets with respect to the angle of arrival. The operations of 1215 may be performed in accordance with examples as disclosed herein. In some examples, aspects of the operations of 1215 may be performed by an indication component 635 as described with reference to FIG. 6.

Figure 13:
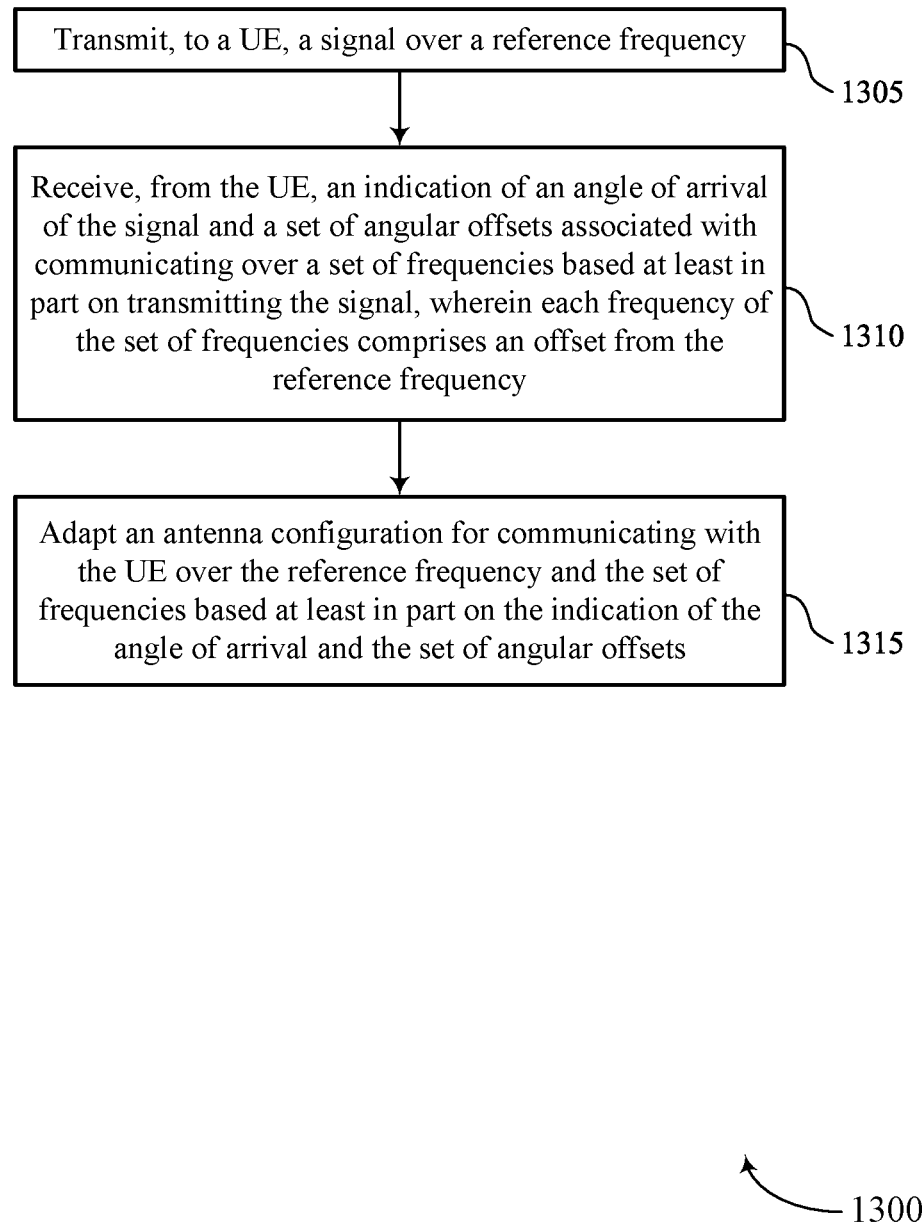

FIG. 13 shows a flowchart illustrating a method 1300 that supports reporting angular offsets across a frequency range in accordance with aspects of the present disclosure. The operations of the method 1300 may be implemented by a base station or its components as described herein. For example, the operations of the method 1300 may be performed by a base station 105 as described with reference to FIGS. 1 through 3 and 8 through 11. In some examples, a base station may execute a set of instructions to control the functional elements of the base station to perform the described functions. Additionally, or alternatively, the base station may perform aspects of the described functions using special-purpose hardware.

At 1305, the method may include transmitting, to a UE, a signal over a reference frequency. The operations of 1305 may be performed in accordance with examples as disclosed herein. In some examples, aspects of the operations of 1305 may be performed by a transmission component 1025 as described with reference to FIG. 10.

At 1310, the method may include receiving, from the UE, an indication of an angle of arrival of the signal and a set of angular offsets associated with communicating over a set of frequencies based on transmitting the signal, where each frequency of the set of frequencies includes a different offset from the reference frequency. The operations of 1310 may be performed in accordance with examples as disclosed herein. In some examples, aspects of the operations of 1310 may be performed by a beam squint component 1030 as described with reference to FIG. 10.

At 1315, the method may include adapting an antenna configuration for communicating with the UE over the reference frequency and the set of frequencies based on the indication of the angle of arrival and the set of angular offsets. The operations of 1315 may be performed in accordance with examples as disclosed herein. In some examples, aspects of the operations of 1315 may be performed by a reception component 1035 as described with reference to FIG. 10.

The following provides an overview of aspects of the present disclosure:

Aspect 1: A method for wireless communication at a UE, comprising: receiving, from a base station, a signal over a reference frequency; determining a set of angular offsets associated with communicating over a set of frequencies based at least in part on an angle of arrival of the signal, wherein each frequency of the set of frequencies comprises an offset in frequency from the reference frequency; and transmitting, to the base station, an indication of the set of angular offsets with respect to the angle of arrival.

Aspect 2: The method of aspect 1, further comprising: determining a set of frequency offsets based at least in part on the set of frequencies and the reference frequency, wherein the set of angular offsets are determined based at least in part on the set of frequency offsets; and generating a report comprising the angle of arrival and the set of angular offsets, each frequency offset of the set of frequency offsets corresponding to an angular offset of the set of angular offsets.

Aspect 3: The method of aspect 2, further comprising: transmitting the report in an uplink control information message, a radio resource control message, or both, wherein transmitting the indication of the set of angular offsets comprises transmitting the report.

Aspect 4: The method of any of aspects 2 through 3, further comprising: receiving, from the base station, a message indicating the set of frequencies, wherein the set of frequency offsets is determined based at least in part on one or more differences between the set of frequencies and the reference frequency.

Aspect 5: The method of aspect 4, wherein the reference frequency is in a first frequency band and one or more of the set of frequencies are in a second frequency band.

Aspect 6: The method of any of aspects 1 through 5, further comprising: determining the angle of arrival of the signal based at least in part on receiving the signal over the reference frequency; determining a set of angles of arrival associated with communicating the signals over the set of frequencies that are offset from the reference frequency based at least in part on the angle of arrival of the signal, wherein the set of angular offsets is determined based at least in part on differences between the set of angles of arrival and the angle of arrival of the signal.

Aspect 7: The method of aspect 6, further comprising: determining, for the angle of arrival of the signal received over the reference frequency, a first component associated with a first axis and a second component associated with a second axis; and determining, for the set of angles of arrival, first components associated with the first axis and second components associated with the second axis.

Aspect 8: The method of aspect 7, wherein determining the set of angular offsets comprises: determining, for the set of angular offsets, first components associated with the first axis based at least in part on differences between the first components of the set of angles of arrival and the first component of the angle of arrival of the signal, and second components associated with the second axis based at least in part on differences between the second components of the set of angles of arrival and the second component of the angle of arrival of the signal.

Aspect 9: The method of aspect 8, further comprising: generating a report comprising a first portion indicating the first components of the set of angular offsets for the first axis and a second portion indicating the second components of the set of angular offsets for the second axis.

Aspect 10: The method of any of aspects 1 through 9, further comprising: receiving one or more reference signals over the reference frequency, wherein the one or more reference signals comprise a channel state information reference signal, a demodulation reference signal, or both; determining the angle of arrival of the signal received over the reference frequency based at least in part on the one or more reference signals.

Aspect 11: The method of aspect 10, wherein determining the angle of arrival of the signal received over the reference frequency comprises: determining a coordinate system based at least in part on a position of the UE relative to a surface of the earth; and determining the angle of arrival in accordance with the coordinate system.

Aspect 12: The method of aspect 11, further comprising: generating a report comprising the set of angular offsets based at least in part on the coordinate system.

Aspect 13: The method of any of aspects 1 through 12, further comprising: determining a second angle of arrival associated with a second signal received over the reference frequency that is different than the angle of arrival; and determining a second set of angular offsets associated with communicating the signals over the set of frequencies that are offset from the reference frequency based at least in on a difference between the second angle of arrival and the angle of arrival satisfying a threshold.

Aspect 14: The method of any of aspects 1 through 13, wherein the set of angular offsets is associated with uplink communications, the method further comprising: determining a second set of angular offsets associated with receiving downlink signals over the set of frequencies, wherein the indication transmitted by the UE indicates the second set of angular offsets.

Aspect 15: The method of any of aspects 1 through 14, further comprising: determining a plurality of sets of angular offsets associated with communicating the signals over the set of frequencies that are offset from the reference frequency, the plurality of sets of angular offsets being associated with a plurality of spatial streams and comprising the set of angular offsets, wherein the indication transmitted by the UE indicates the plurality of spatial streams and the plurality of sets of angular offsets.

Aspect 16: The method of any of aspects 1 through 15, wherein the set of angular offsets is based at least in part on an antenna configuration of the UE, an orientation of the UE, a polarization of a corresponding signal, a frequency of the corresponding signal, or any combination thereof.

Aspect 17: A method for wireless communication at a base station, comprising: transmitting, to a UE, a signal over a reference frequency; receiving, from the UE, an indication of an angle of arrival of the signal and a set of angular offsets associated with communicating over a set of frequencies based at least in part on transmitting the signal, wherein each frequency of the set of frequencies comprises an offset in frequency from the reference frequency; and adapting an antenna configuration for communicating with the UE over the reference frequency and the set of frequencies based at least in part on the indication of the angle of arrival and the set of angular offsets.

Aspect 18: The method of aspect 17, wherein adapting the antenna configuration comprises: modifying a configuration of one or more antenna panels of an antenna array based at least in part on the indication of the angle of arrival and the set of angular offsets.

Aspect 19: The method of any of aspects 17 through 18, wherein adapting the antenna configuration comprises: modifying a configuration of one or more transmission/reception points based at least in part on the indication of the angle of arrival and the set of angular offsets.

Aspect 20: The method of any of aspects 17 through 19, further comprising: transmitting, to the UE, a message indicating the set of frequencies, wherein the indication of the set of angular offsets received from the UE is based at least in part on the message.

Aspect 21: The method of any of aspects 17 through 20, further comprising: activating a set of component carriers for communicating with the UE based at least in part on the indication of the set of angular offsets.

Aspect 22: The method of any of aspects 17 through 21, wherein receiving the indication of the angle of arrival and the set of angular offsets comprises: receiving a first component of the angle of arrival associated with a first axis, a second component of the angle of arrival associated with a second axis, first components of the set of angular offsets associated with the first axis, and second components of the set of angular offsets associated with the second axis.

Aspect 23: The method of any of aspects 17 through 22, further comprising: receiving, from the UE, a message indicating a coordinate system used by the UE and a position of the UE relative to a surface of the earth.

Aspect 24: An apparatus for wireless communication at a UE, comprising a processor; memory coupled with the processor; and instructions stored in the memory and executable by the processor to cause the apparatus to perform a method of any of aspects 1 through 16.

Aspect 25: An apparatus for wireless communication at a UE, comprising at least one means for performing a method of any of aspects 1 through 16.

Aspect 26: A non-transitory computer-readable medium storing code for wireless communication at a UE, the code comprising instructions executable by a processor to perform a method of any of aspects 1 through 16.

Aspect 27: An apparatus for wireless communication at a base station, comprising a processor; memory coupled with the processor; and instructions stored in the memory and executable by the processor to cause the apparatus to perform a method of any of aspects 17 through 23.

Aspect 28: An apparatus for wireless communication at a base station, comprising at least one means for performing a method of any of aspects 17 through 23.

Aspect 29: A non-transitory computer-readable medium storing code for wireless communication at a base station, the code comprising instructions executable by a processor to perform a method of any of aspects 17 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   one or more processors;
   one or more memories coupled with the one or more processors; and
   instructions stored in the one or more memories and executable by the one or more processors to cause the apparatus to:
      receive, from a network entity, a signal over a reference frequency;
      determine a set of angular offsets associated with communicating over a set of frequencies based at least in part on an angle of arrival of the signal, wherein each frequency of the set of frequencies comprises an offset in frequency from the reference frequency; and
      transmit, to the network entity, an indication of the set of angular offsets with respect to the angle of arrival, wherein each angular offset of the set of angular offsets corresponds to a respective frequency of the set of frequencies.

2. The apparatus of claim 1, wherein the instructions are further executable by the one or more processors to cause the apparatus to:
   determine a set of frequency offsets based at least in part on the set of frequencies and the reference frequency, wherein the set of angular offsets are determined based at least in part on the set of frequency offsets; and
   generate a report comprising the angle of arrival and the set of angular offsets, each frequency offset of the set of frequency offsets corresponding to an angular offset of the set of angular offsets.

3. The apparatus of claim 2, wherein the instructions are further executable by the one or more processors to cause the apparatus to:
   transmit the report in an uplink control information message, a radio resource control message, or both, wherein transmitting the indication of the set of angular offsets comprises transmitting the report.

4. The apparatus of claim 2, wherein the instructions are further executable by the one or more processors to cause the apparatus to:
   receive, from the network entity, a message indicating the set of frequencies, wherein the set of frequency offsets is determined based at least in part on one or more differences between the set of frequencies and the reference frequency.

5. The apparatus of claim 4, wherein the reference frequency is in a first frequency band and one or more of the set of frequencies are in a second frequency band.

6. The apparatus of claim 1, wherein the instructions are further executable by the one or more processors to cause the apparatus to:
   determine the angle of arrival of the signal based at least in part on receiving the signal over the reference frequency; and
   determine a set of angles of arrival associated with communicating over the set of frequencies that are offset in frequency from the reference frequency based at least in part on the angle of arrival of the signal, wherein the set of angular offsets is determined based at least in part on differences between the set of angles of arrival and the angle of arrival of the signal.

7. The apparatus of claim 6, wherein the instructions are further executable by the one or more processors to cause the apparatus to:
   determine, for the angle of arrival of the signal received over the reference frequency, a first component associated with a first axis and a second component associated with a second axis; and
   determine, for the set of angles of arrival, first components associated with the first axis and second components associated with the second axis.

8. The apparatus of claim 7, wherein the instructions to determine the set of angular offsets are executable by the one or more processors to cause the apparatus to:
   determine, for the set of angular offsets, first components associated with the first axis based at least in part on differences between the first components of the set of angles of arrival and the first component of the angle of arrival of the signal, and second components associated with the second axis based at least in part on differences between the second components of the set of angles of arrival and the second component of the angle of arrival of the signal.

9. The apparatus of claim 8, wherein the instructions are further executable by the one or more processors to cause the apparatus to:
   generate a report comprising a first portion indicating the first components of the set of angular offsets for the first axis and a second portion indicating the second components of the set of angular offsets for the second axis.

10. The apparatus of claim 1, wherein the instructions are further executable by the one or more processors to cause the apparatus to:
    receive one or more reference signals over the reference frequency, wherein the one or more reference signals comprise a channel state information reference signal, a demodulation reference signal, or both; and
    determine the angle of arrival of the signal received over the reference frequency based at least in part on the one or more reference signals.

11. The apparatus of claim 10, wherein the instructions to determine the angle of arrival of the signal received over the reference frequency are executable by the one or more processors to cause the apparatus to:

determine a coordinate system based at least in part on a position of the UE relative to a surface of the earth; and
determine the angle of arrival in accordance with the coordinate system.

12. The apparatus of claim 11, wherein the instructions are further executable by the one or more processors to cause the apparatus to:
generate a report comprising the set of angular offsets based at least in part on the coordinate system.

13. The apparatus of claim 1, wherein the instructions are further executable by the one or more processors to cause the apparatus to:
determine a second angle of arrival associated with a second signal received over the reference frequency that is different than the angle of arrival; and
determine a second set of angular offsets associated with communicating over the set of frequencies that are offset in frequency from the reference frequency based at least in part on a difference between the second angle of arrival and the angle of arrival satisfying a threshold.

14. The apparatus of claim 1, wherein the set of angular offsets is associated with uplink communications, and the instructions are further executable by the one or more processors to cause the apparatus to:
determine a second set of angular offsets associated with receiving downlink signals over the set of frequencies, wherein the indication transmitted by the UE indicates the second set of angular offsets.

15. The apparatus of claim 1, wherein the instructions are further executable by the one or more processors to cause the apparatus to:
determine a plurality of sets of angular offsets associated with communicating over the set of frequencies that are offset in frequency from the reference frequency, the plurality of sets of angular offsets being associated with a plurality of spatial streams and comprising the set of angular offsets, wherein the indication transmitted by the UE indicates the plurality of spatial streams and the plurality of sets of angular offsets.

16. The apparatus of claim 1, wherein the set of angular offsets is based at least in part on an antenna configuration of the UE, an orientation of the UE, a polarization of a corresponding signal, a frequency of the corresponding signal, or any combination thereof.

17. An apparatus for wireless communication at a network entity, comprising:
one or more processors;
one or more memories coupled with the one or more processors; and
instructions stored in the one or more memories and executable by the one or more processors to cause the apparatus to:
transmit, to a user equipment (UE), a signal over a reference frequency;
receive, from the UE, an indication of an angle of arrival of the signal and a set of angular offsets associated with communicating over a set of frequencies based at least in part on transmitting the signal, wherein each frequency of the set of frequencies comprises an offset in frequency from the reference frequency, and wherein each angular offset of the set of angular offsets corresponds to a respective frequency of the set of frequencies; and
adapt an antenna configuration for communicating with the UE over the reference frequency and the set of frequencies based at least in part on the indication of the angle of arrival and the set of angular offsets.

18. The apparatus of claim 17, wherein the instructions to adapt the antenna configuration are executable by the one or more processors to cause the apparatus to:
modify a configuration of one or more antenna panels of an antenna array based at least in part on the indication of the angle of arrival and the set of angular offsets.

19. The apparatus of claim 17, wherein the instructions to adapt the antenna configuration are executable by the one or more processors to cause the apparatus to:
modify a configuration of one or more transmission/reception points based at least in part on the indication of the angle of arrival and the set of angular offsets.

20. The apparatus of claim 17, wherein the instructions are further executable by the one or more processors to cause the apparatus to:
transmit, to the UE, a message indicating the set of frequencies, wherein the indication of the set of angular offsets received from the UE is based at least in part on the message.

21. The apparatus of claim 17, wherein the instructions are further executable by the one or more processors to cause the apparatus to:
activate a set of component carriers for communicating with the UE based at least in part on the indication of the set of angular offsets.

22. The apparatus of claim 17, wherein the instructions to receive the indication of the angle of arrival and the set of angular offsets are executable by the one or more processors to cause the apparatus to:
receive a first component of the angle of arrival associated with a first axis, a second component of the angle of arrival associated with a second axis, first components of the set of angular offsets associated with the first axis, and second components of the set of angular offsets associated with the second axis.

23. The apparatus of claim 17, wherein the instructions are further executable by the one or more processors to cause the apparatus to:
receive, from the UE, a message indicating a coordinate system used by the UE and a position of the UE relative to a surface of the earth.

24. A method for wireless communication at a user equipment (UE), comprising:
receiving, from a network entity, a signal over a reference frequency;
determining a set of angular offsets associated with communicating over a set of frequencies based at least in part on an angle of arrival of the signal, wherein each frequency of the set of frequencies comprises an offset in frequency from the reference frequency; and
transmitting, to the network entity, an indication of the set of angular offsets with respect to the angle of arrival, wherein each angular offset of the set of angular offsets corresponds to a respective frequency of the set of frequencies.

25. The method of claim 24, further comprising:
determining a set of frequency offsets based at least in part on the set of frequencies and the reference frequency, wherein the set of angular offsets are determined based at least in part on the set of frequency offsets; and
generating a report comprising the angle of arrival and the set of angular offsets, each frequency offset of the set of frequency offsets corresponding to an angular offset of the set of angular offsets.

26. The method of claim 25, further comprising:
transmitting the report in an uplink control information message, a radio resource control message, or both, wherein transmitting the indication of the set of angular offsets comprises transmitting the report.

27. The method of claim 25, further comprising:
receiving, from the network entity, a message indicating the set of frequencies, wherein the set of frequency offsets is determined based at least in part on one or more differences between the set of frequencies and the reference frequency.

28. A method for wireless communication at a network entity, comprising:
transmitting, to a user equipment (UE), a signal over a reference frequency;
receiving, from the UE, an indication of an angle of arrival of the signal and a set of angular offsets associated with communicating over a set of frequencies based at least in part on transmitting the signal, wherein each frequency of the set of frequencies comprises an offset in frequency from the reference frequency, and wherein each angular offset of the set of angular offsets corresponds to a respective frequency of the set of frequencies; and
adapting an antenna configuration for communicating with the UE over the reference frequency and the set of frequencies based at least in part on the indication of the angle of arrival and the set of angular offsets.

29. The method of claim 28, wherein adapting the antenna configuration comprises:
modifying a configuration of one or more antenna panels of an antenna array based at least in part on the indication of the angle of arrival and the set of angular offsets.

30. The method of claim 28, wherein adapting the antenna configuration comprises:
modifying a configuration of one or more transmission/reception points based at least in part on the indication of the angle of arrival and the set of angular offsets.

* * * * *